United States Patent [19]
Newlin

[11] Patent Number: 6,011,579
[45] Date of Patent: Jan. 4, 2000

[54] APPARATUS, METHOD AND SYSTEM FOR WIRELINE AUDIO AND VIDEO CONFERENCING AND TELEPHONY, WITH NETWORK INTERACTIVITY

[75] Inventor: Douglas J. Newlin, Geneva, Ill.

[73] Assignee: Motorola, Inc., Schaumburg, Ill.

[21] Appl. No.: 08/763,159

[22] Filed: Dec. 10, 1996

[51] Int. Cl.$^7$ ..................................................... H04N 7/14
[52] U.S. Cl. ............................ 348/15; 348/17; 379/93.21
[58] Field of Search ................................. 348/14, 15, 17, 348/6, 12; 379/93.07, 93.21

[56] References Cited

U.S. PATENT DOCUMENTS

| | | | |
|---|---|---|---|
| 5,534,914 | 7/1996 | Flohr et al. | 348/14 |
| 5,585,837 | 12/1996 | Nixon | 348/6 |
| 5,654,747 | 8/1997 | Ottesen et al. | 348/12 |
| 5,790,173 | 8/1998 | Strauss et al. | 348/12 |
| 5,864,512 | 1/1999 | Buckelew et al. | 365/230.01 |

FOREIGN PATENT DOCUMENTS 401311744A 12/1989 Japan ............................... H04M 1/00

*Primary Examiner*—Curtis A. Kuntz
*Assistant Examiner*—Melur Ramakrishnaiah
*Attorney, Agent, or Firm*—Terri S. Hughes

[57] ABSTRACT

A video access apparatus (110, 150, 160) provides for audio and video teleconferencing and telephony via a first communication channel (103) having communication with a network (140), such as the public switched telephone network or an ISDN network. The network (140) is preferably an intelligent network (115) having an intelligent peripheral (125) which provides for user interface functionality, for call control and configuration, and for interworking functions. The video access apparatus (160) includes a wireline network interface (210) for reception of a first protocol signal to form a received protocol signal and for transmission of a second protocol signal to form a transmitted protocol signal; a radio frequency modulator/demodulator (205) to convert a baseband output video signal to a radio frequency output video signal and to convert a radio frequency input video signal to a baseband input video signal; and a processor arrangement (190) responsive, through a set of program instructions, to convert the received protocol signal to the baseband output video signal and to an output audio signal, and to convert the baseband input video signal and an input audio signal to the second protocol signal.

2 Claims, 8 Drawing Sheets

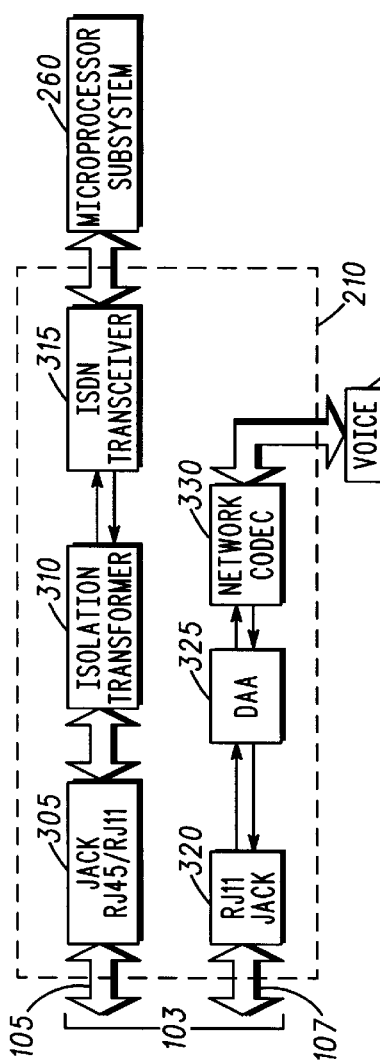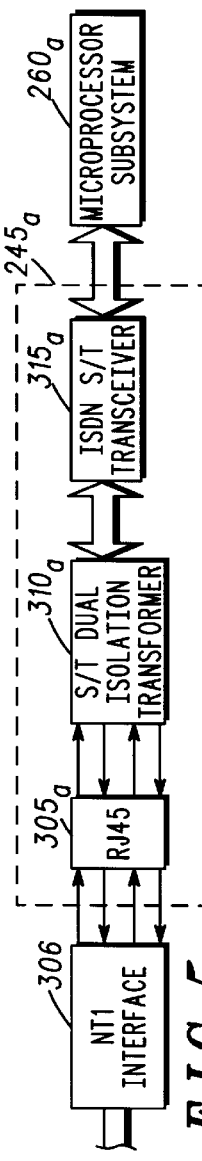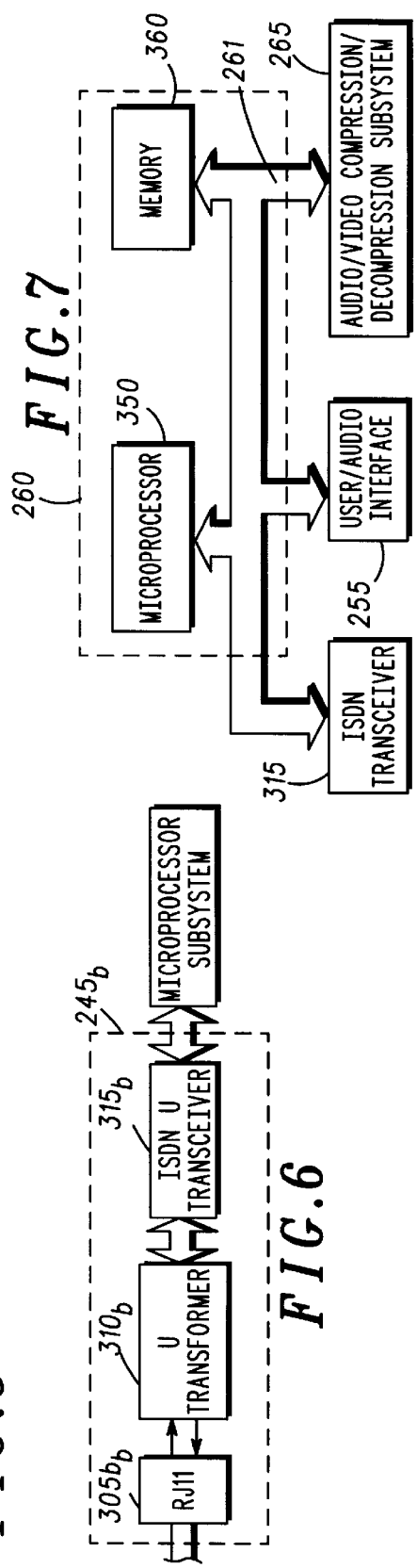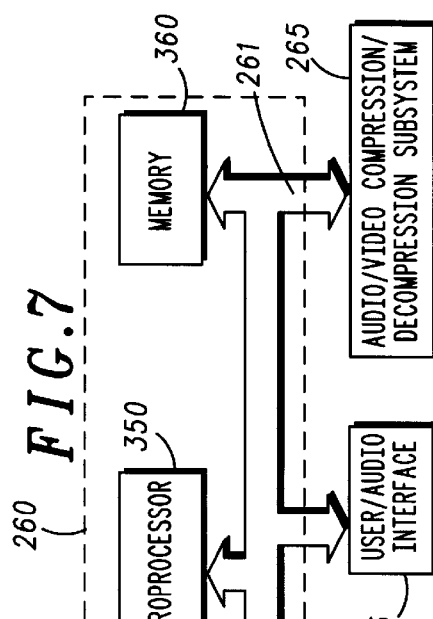

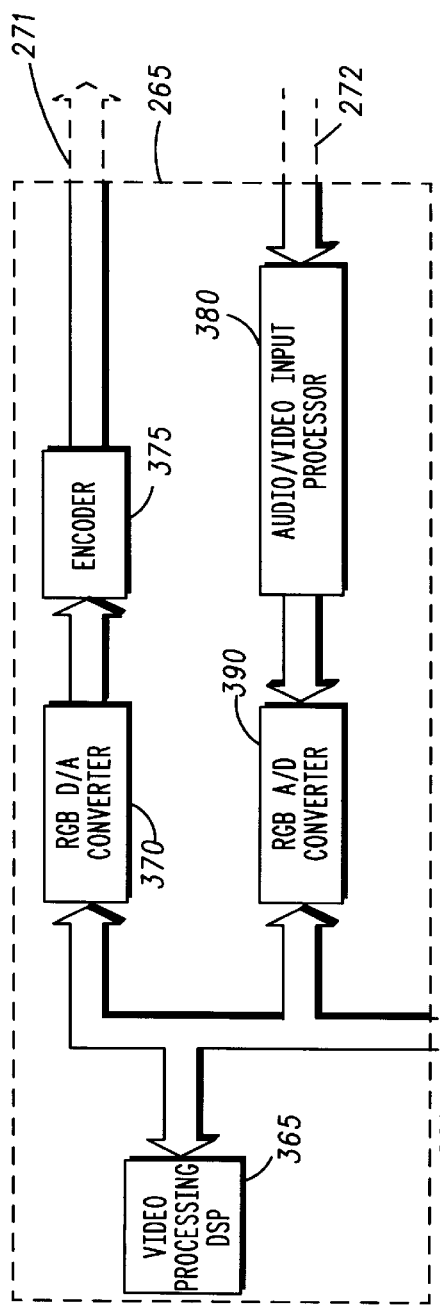
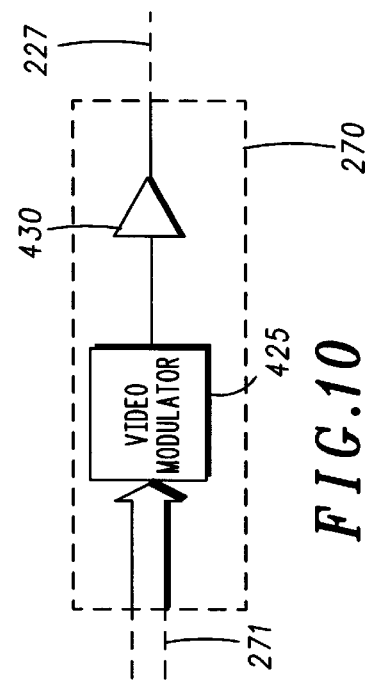
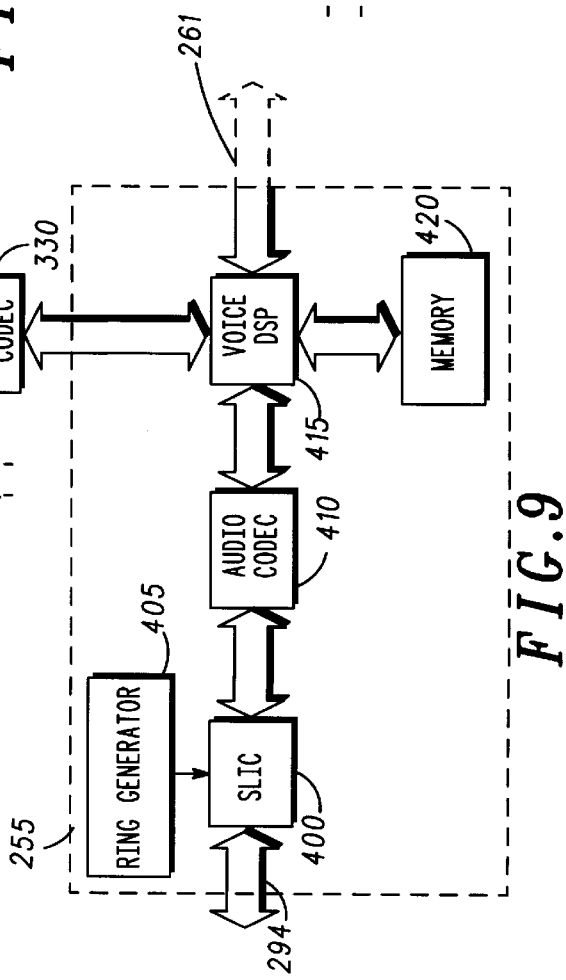

APPARATUS, METHOD AND SYSTEM FOR WIRELINE AUDIO AND VIDEO CONFERENCING AND TELEPHONY, WITH NETWORK INTERACTIVITY

CROSS-REFERENCE TO RELATED APPLICATIONS

This application is related to the following U.S. Patent Applications, each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", Motorola Docket No. PD05634AM (the "first related application");

Burke et al., U.S. patent application Ser. No. 08/706,100, filed Aug. 30, 1996, entitled "Apparatus, Method And System For Audio And Video Conferencing And Telephony", Motorola Docket No. PD05686AM (the "second related application");

Burke et al., U.S. patent application Ser. No. 08/715,887, filed Sep. 18, 1996, entitled "Videophone Apparatus, Method And System For Audio And Video Conferencing And Telephony", Motorola Docket No. PD05689AM (the "third related application");

Newlin et al., U.S. patent application Ser. No. 08/672,819, filed Jun. 28, 1996, entitled "ISDN Communication System and Method Thereof", Motorola Docket No. PD05677AM (the "fourth related application");

Burke et al., U.S. patent application Ser. No. 08/725,602, filed Oct. 3, 1996, entitled "Apparatus, Method And System For Wireline Audio And Video Conferencing And Telephony", Motorola Docket No. PD05703AM (the "fifth related application"); and Burke et al., U.S. patent application Ser. No. 08/726,329, filed Oct. 3, 1996, entitled "Videophone Apparatus, Method And System For Wireline Audio And Video Conferencing And Telephony", Motorola Docket No. PD05725AM (the "sixth related application");

Newlin et al., U.S. patent application Ser. No. 08/735,295, filed Oct. 22, 1996, entitled "Apparatus, Method And System For Multimedia Control And Communication", Motorola Docket No. PD05688AM (the "seventh related application"); and Burke et al., U.S. patent application Ser. No. 08/754,184, filed Nov. 27, 1996, entitled "Apparatus, Method And System For Wireless Audio And Video Conferencing And Telephony", Motorola Docket No. PD05709AM (the "eighth related application").

FIELD OF THE INVENTION

This invention relates in general to audio and video communications systems and, more specifically, to an apparatus, method and system for wireline audio and video conferencing and telephony.

BACKGROUND OF THE INVENTION

Currently, audio and video (visual) conferencing capabilities are implemented as computer based systems, such as in personal computers ("PCs"), as stand-alone, "roll about" room systems, and as videophones. These systems typically require new and significant hardware, software and programming, and may also require significant communications network connections, for example, multiple channels ("DS0s") of an Integrated Services Digital Network ("ISDN") connection or a T1/E1 connection.

For example, stand-alone, "roll about" room systems for audio and video conferencing typically require dedicated hardware at significant expense, in the tens of thousands of dollars, utilizing dedicated video cameras, television or video displays, microphone systems, and the additional video conferencing equipment. Such systems may also require as many as six (or more) contiguous ISDN B channels (or T1/E1 DS0s), each operating at 64 kbps (kilobits per second). Such communication network capability is also expensive and potentially unnecessary, particularly when the additional channels are not in continuous use.

Current audio/visual telephony or conferencing systems are also limited to providing such audio/visual functionality only at designated nodes, i.e., the specific system location, and are neither mobile nor distributed (having multiple locations). Stand-alone, "roll about" room systems allow such audio and video conferencing only within or at that particular physical location. Videophones are also currently limited to their installed locations. Similarly, PC based systems provide such functionality only at the given PC having the necessary network connections (such as ISDN) and having the specified audio/visual conferencing equipment, such as a video camera, microphone, and the additional computer processing boards which provide for the audio/visual processing. For other PCs to become capable of such audio/visual conferencing functionality, they must also be equipped with any necessary hardware, software, programming and network connections.

Such conventional audio/visual conferencing systems are also difficult to assemble, install, and use. For example, the addition of audio/visual functionality to a PC requires the addition of a new PC card, camera, microphone, the installation of audio/visual control software, and the installation of new network connections, such as ISDN. PC based systems typically require, at a minimum, ISDN basic rate interface service, consisting of 2 ISDN B channels (each operating at 64 kbps) plus one D channel (operating at 16 kbps). In addition, such network connectivity may require additional programming of the PC with necessary ISDN specific configuration information, such as configuration information specific to the central office switch type of the service provider and ISDN service profile identifier (SPID) information. Video conference call set up procedures typically are also difficult and complicated utilizing these current systems.

Conventional audio/visual telephony and conferencing equipment is also limited to communication with similar equipment at the far end (remote location). For example, videophone systems which utilize typical telephone systems ("POTS" (plain old telephone service)) transmit information in analog form, for example, as trellis code modulated data, at V.34 and V.34bis rates (e.g., highest data rates of approximately 28.8 to 33 kbps). Such POTS-based videophone systems would not be compatible with ISDN audio/visual conferencing and telephony systems which transmit information in digital form, such as utilizing Q.931 message signaling, Q.921 LAPD datalink, and Q.910 physical interface digital protocols, with data rates of 128 kbps (two B channels) or more (with additional channels or DS0s).

In addition, such current audio/visual telephony and conferencing equipment are relatively expensive and, in most instances, sufficiently expensive to be prohibitive for in-home or other consumer use. For example, the cost of roll about, room based systems is typically tens of thousands of dollars. PC based videoconferencing systems are also expensive, with costs in the thousands of dollars.

Current audio/visual telephony and conferencing equipment also do not provide for multiple, simultaneous video conferences from more than one location. In addition, current systems (such as those in PCs) do not provide for multiplexed video conference sessions, in which the output video may include display of video input from several video cameras at multiple locations.

Accordingly, a need has remained for audio/visual conferencing and telephony systems, equipment, and methods which may operate at more than one designated node or location within the user premises, or may be mobile, or may be configured as needed for additional locations. Such a system should be compatible for use with other existing video conferencing systems, should be user friendly, easy to install and use, and should be relatively less expensive for in-home purchase and use by consumers. In addition, such a system should be able to provide multiple video conferencing sessions which may originate from multiple locations.

BRIEF DESCRIPTION OF THE DRAWINGS

FIG. 4 is a block diagram illustrating a wireline network interface of the preferred apparatus embodiment in accordance with the present invention.

FIG. 5 is a block diagram illustrating an embodiment of an ISDN portion of a wireline network interface utilizing an ISDN S/T interface.

FIG. 6 is a block diagram illustrating an embodiment of an ISDN portion of a wireline network interface utilizing an ISDN U interface.

FIG. 7 is a block diagram illustrating a microprocessor subsystem of the preferred apparatus embodiment in accordance with the present invention.

FIG. 8 is a block diagram illustrating an audio/video compression and decompression subsystem of the preferred apparatus embodiment in accordance with the present invention.

FIG. 9 is a block diagram illustrating a user audio interface of the preferred apparatus embodiment in accordance with the present invention.

FIG. 10 is a block diagram illustrating an RF modulator of the preferred apparatus embodiment in accordance with the present invention.

DETAILED DESCRIPTION OF THE INVENTION

As mentioned above, a need has remained for audio/visual conferencing and telephony systems, apparatus, and methods which may operate at more than one designated node or location within user premises, or may be mobile, or may be configured as needed for additional locations. As illustrated in FIGS. 1 through 15 discussed below, the preferred embodiment of the invention provides for such audio and visual conferencing and telephony capability at one or more locations within the user premises, may be mobile, and may be configured as needed for additional locations. In addition, in accordance with the preferred embodiment, the audio/visual conferencing and telephony system utilizes equipment typically found in consumers' homes or premises, such as existing televisions, video cameras or camcorders, and telephones. In addition, such a system is designed to be compatible for use with other existing video conferencing systems, may be utilized over a variety of connected telecommunications networks (such as ISDN or POTS), is user friendly, easy to install and use, and should be relatively less expensive for in-home purchase and use by consumers.

Figure 1:
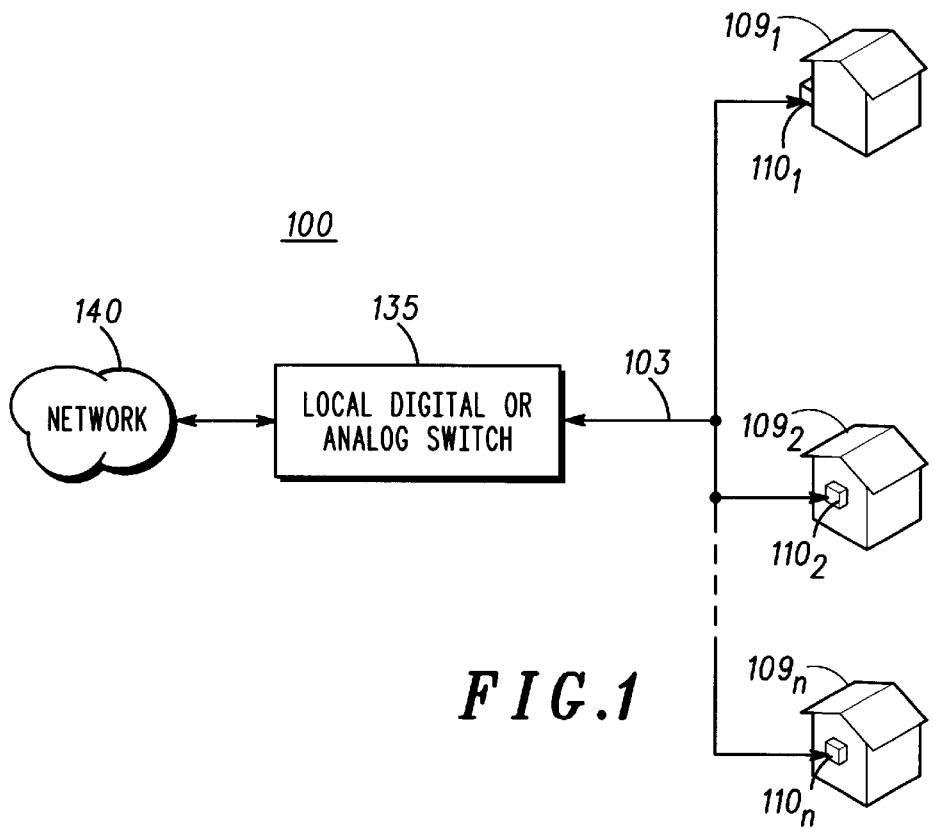
FIG. 1 is a block diagram illustrating an audio/video network configuration for a video access apparatus in accordance with the present invention.
Figure 2:
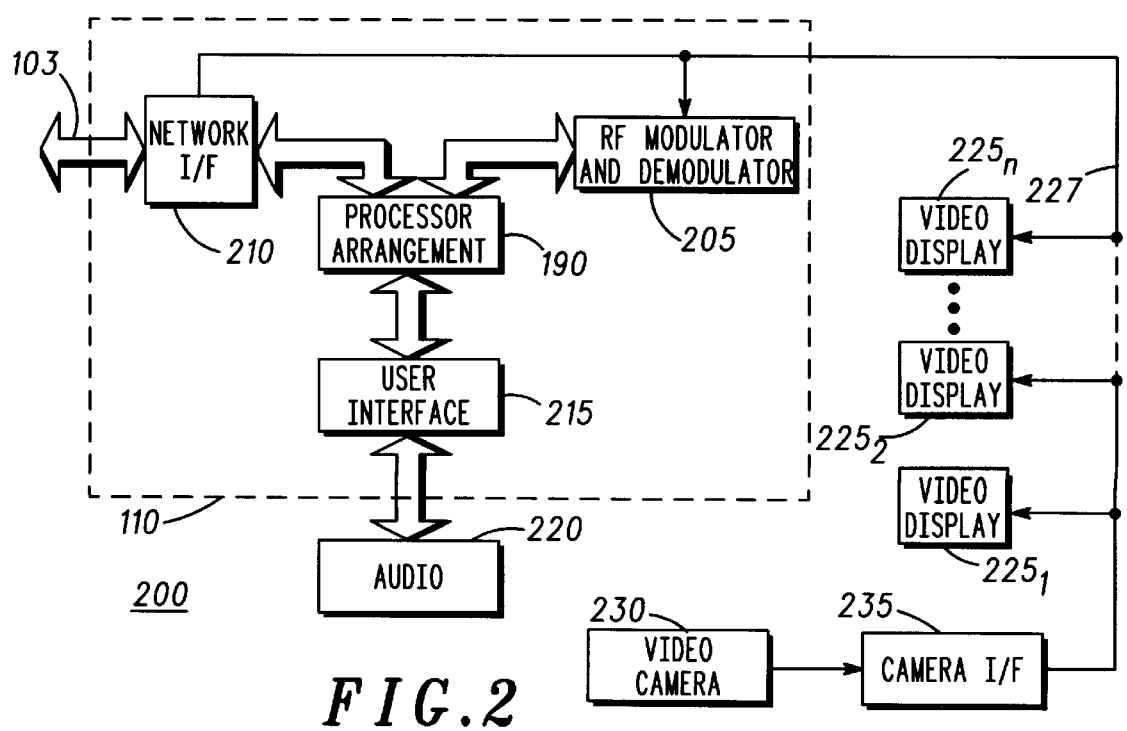
FIG. 2 is a block diagram illustrating a first embodiment of a video access apparatus and a first embodiment of a video conferencing system in accordance with the present invention.

FIG. 1 is a block diagram illustrating a configuration of an audio/video network 100 for a video access apparatus 110 in accordance with the present invention. As illustrated in FIG. 1, video access apparatus $110_1$ through video access apparatus $110_n$ (individually and collectively referred to as a video access apparatus(es) 110) may have an outdoor location, for example, at subscriber premises $109_1$ (video access apparatus $110_1$), or may have indoor locations, for example, at subscriber premises $109_2$ and $109_n$ (video access apparatus $110_1$ and video access apparatus $110_n$). The video access apparatus 110 illustrated in FIG. 1 may have a first embodiment as illustrated in FIG. 2, a second and preferred embodiment as video access apparatus 150 illustrated in FIG. 3, or a third and preferred embodiment as video access apparatus 160 illustrated in FIG. 15, and as a consequence, as used herein, reference to any of the embodiments of the video access apparatuses 110, 150 or 160 shall be understood to mean and include the other apparatus embodiment or its equivalents. Referring to FIG. 1, in accordance with the invention, the video access apparatus 110 provides audio and video telephony and conferencing services over a first communication channel 103 which, in the preferred embodiment, is wireline, such as one or more twisted pair wires, utilized in the audio/video network 100 (which may have multiple configurations). Also in the preferred embodiment, the first communication channel 103 may be utilized for both digital and analog communications, such as ISDN and ordinary telephony commonly known as POTS. The first communication channel 103, in turn, is connected through a local digital (or analog) switch 135 to a network 140. The network 140, for example, may be a public switched telephone network ("PSTN") or an Integrated Services Digital Network ("ISDN"), or any combination of such existing or future telecommunications networks.

As illustrated above, the video access apparatus 110 (or 150) of the present invention is directly coupleable (through a local digital or analog switch 135 of a network provider central office) to a network 140, such as ISDN or PSTN. As a consequence, the video access apparatus 110 (150 or 160)

of the present invention may be utilized with currently existing telecommunications infrastructure, such as ISDN or PSTN. In contrast, the video access apparatus disclosed in the second and third related applications communicated with an intervening primary station which then provided access both to a cable video services infrastructure and to a network, such as ISDN or PSTN, utilizing a protocol such as CACS (Cable ACcess Signaling) over a communication channel (such as a preferred hybrid fiber coaxial cable). While use of CACS and the system disclosed in the second and third related applications have certain advantages, such as very high speed, low error rate, asynchronous packet data transfer with very high data throughput, utilizing on demand channel assignment, direct network connectivity was precluded. As a consequence, in accordance with the present invention, direct network connectivity is provided, such that the video access apparatus 110 (150 or 160) of the present invention may be utilized, for video conferencing and telephony, directly with currently existing telecommunications network infrastructure, such as ISDN or PSTN, without further infrastructure requirements.

FIG. 2 is a high level block diagram illustrating a first embodiment of a video access apparatus, namely, video access apparatus 110, and illustrating a video conferencing system 200, in accordance with the present invention. The video conferencing system 200, in accordance with the present invention, includes a video access apparatus 110, audio 220, one or more video displays 225$_1$ through 225$_n$ (individually and collectively referred to as video display(s) 225), camera interface 235, and video camera 230. The video access apparatus 110 is coupleable to a first communication channel 103, for communication with a network 140 via a local digital or analog switch 135, and is coupled to a second communication channel 227, typically located within or about the user (or subscriber) premises 109. For example, the second communication channel 227 may be an internal 75 Ohm coaxial cable typically utilized with cable television, or may be another form of communication channel, such as twisted pair or other wireline, wireless, or PLC (power line carrier, over existing premise AC power lines). The audio 220 is coupled to the video access apparatus 110, and may include a microphone and speaker or, as discussed below with reference to FIG. 3, may be preferably embodied as a telephone (or, equivalently, a speaker phone). One or more video displays 225 are utilized to display the incoming video portion of an audio and video conferencing call or session (incoming in the sense of having been transmitted to the video access apparatus 110 from another location), may also include a speaker for output of the incoming audio portion of an audio and video conferencing call or session, and are implemented utilizing one or more televisions in the preferred embodiment. The video camera 230 is utilized to generate the outgoing video portion of an audio and video conferencing call or session (outgoing in the sense of being transmitted from the video access apparatus 110 to another location), may also include a microphone for generation of the outgoing audio portion of an audio and video conferencing call or session, and is implemented utilizing an ordinary video camera or camcorder in the preferred embodiment. The camera interface 235 is utilized to modulate the video output signal from the video camera 230 for transmission on the second communication channel 227 to the video access apparatus 110 and, as discussed in greater detail below, the camera interface 235 also may be directly incorporated within the video camera 230.

Continuing to refer to FIG. 2, the video access apparatus 110 includes a wireline network interface 210 (also referred to equivalently as a network interface 210), a radio frequency (RF) modulator and demodulator 205 (also referred to as an RF modulator/demodulator 205), a user interface 215, and a processor arrangement 190. The wireline network interface 210 is coupleable to the first communication channel 103 for reception of a first protocol signal from the network 140, to form a received protocol signal, and for transmission of a second protocol signal to the network 140, to form a transmitted protocol signal. These first and second protocol signals may have multiple layers and types of protocol encoding and modulation. First, such first and second protocol signals preferably include audio/video compression (and decompression) encoding (and decoding), preferably utilizing the International Telecommunications Union (ITU) H.32x series or family of protocols, such as H.320 utilized with digital services (ISDN), H.324 utilized with analog services (PSTN), H.323 utilized with LANs (local area networks), other H.32x protocols (such as H.321 and H.322), and other ITU protocols pertaining to audio/video and other data communication. In addition, in the preferred embodiment, additional protocol layers are employed, involving further encoding/decoding and/or modulation/demodulation of an H.32x encoded audio/video signal. In the preferred embodiment, for ISDN transmission and reception, ISDN protocols are utilized for encoding, decoding, framing, etc., of an H.32x encoded audio/video signal, utilizing, for example, Q.931 message signaling, Q.921 LAPD data link, and Q.910 physical layer (interface) digital protocols. Also in the preferred embodiment, for PSTN (POTS) transmission and reception, an H.32x encoded audio/video signal is further protocol encoded/decoded and modulated/demodulated utilizing the ITU V.x family or series of analog transmission protocols, such as V.34, V.34bis, or potentially or proposed higher data rate analog protocols. For example, for an analog POTS transmission, the audio/video data may be compressed and formatted utilizing ITU H.323 or H.324 protocols, then further encoded and modulated utilizing ITU V.34 or V.34bis protocols. As discussed in greater detail below with reference to FIG. 4, the wireline network interface 210 is utilized to transmit and receive analog or digital video and audio information and data (generally referred to as data), in any given format, protocol, or modulation scheme compatible with the network 140 and any particular network connections. For example, when coupled to an ISDN via the first communication channel 103, the wireline network interface 210 will transmit and receive data in accordance with the ISDN series of protocols, such as the Q.x series.

Also, as used herein, input and output directions are defined to avoid confusion between incoming and outgoing signals because, for example, an incoming signal to the video access apparatus 110 from the network 140 will also be an outgoing signal from the video access apparatus 110 when transmitted to a video display 225 on the second communication channel 227. As a consequence, as used herein, input and output directions are defined at the interface between the video access apparatus 110, on the one hand, and the second communication channel 227 or audio 220, on the other hand, as follows: an input signal, such as an input video or audio signal, is input to the video access apparatus 110 from the second communication channel 227 (or, in the case of input audio, from the audio 220), and may originate, for example, from the video camera 230, and will be transmitted from the video access apparatus 110 to the network 140; conversely, an output signal, such as an output video or audio signal, is output from the video access apparatus 110 to the second communication channel 227 (or, in the case of output audio, to the audio 220), and may originate, for example, from a remote location via the network 140, is received by the video access apparatus 110 via the first communication channel 103, and will be transmitted or output by the video access apparatus 110 on the second communication channel 227 to a video display 225 or output to audio 220.

Figure 3:
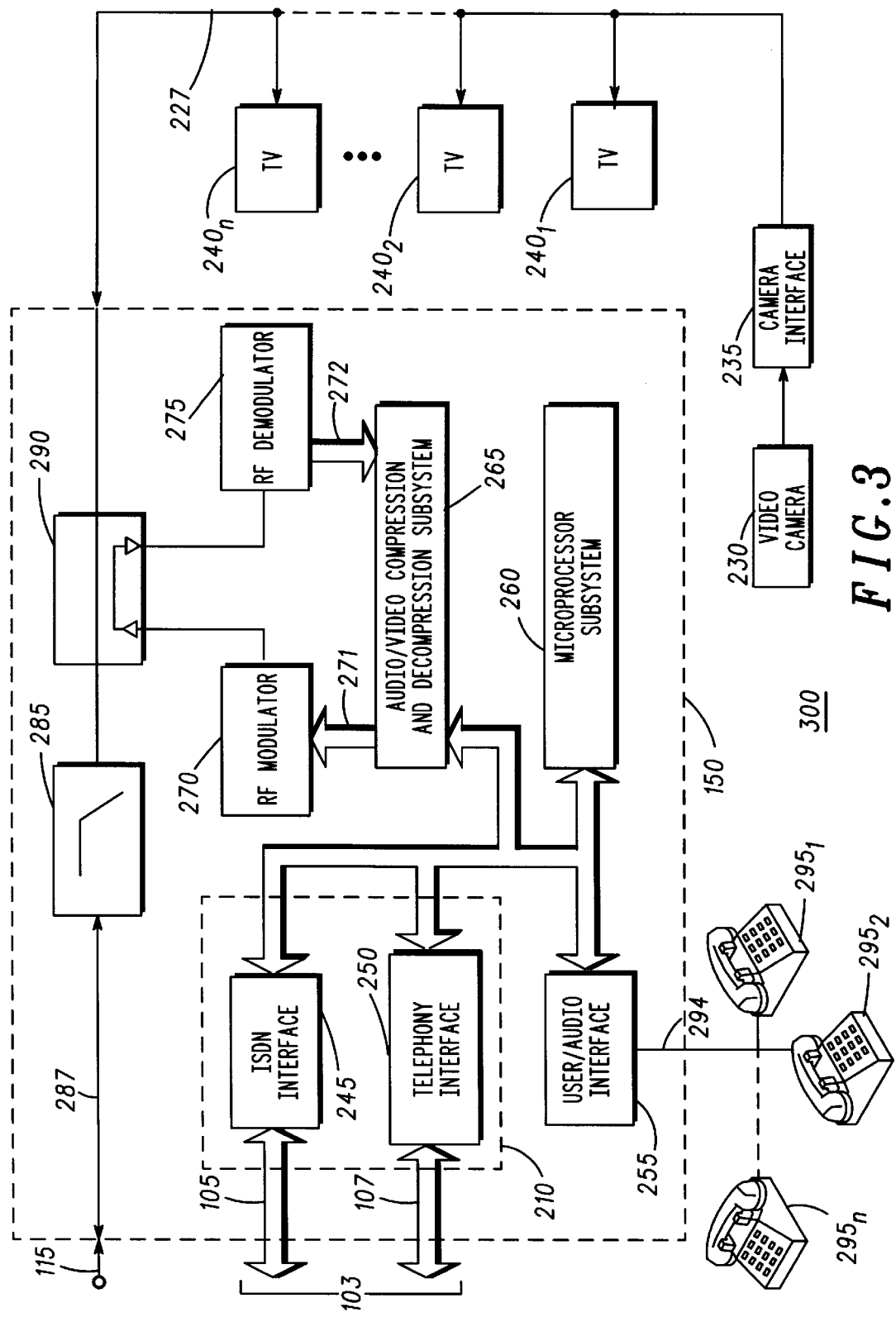
FIG. 3 is a detailed block diagram illustrating a second embodiment of a video access apparatus and a second embodiment of a video conferencing system in accordance with the present invention.

Continuing to refer to FIG. 2, the RF modulator and demodulator 205 is utilized to convert a baseband output video signal (from the processor arrangement 190) to a radio frequency output video signal, for transmission on the second communication channel 227 and reception by one or more of the video displays 225, and to convert a radio frequency input video signal (from the camera interface 235) to a baseband input video signal, for input to the processor arrangement 190. The user interface 215 is utilized for reception of a control signal of a plurality of control signals, such as a request to place a telephony call, a request to place an audio and video conference call, and other control signals such as alerting signals of incoming telephony or audio and video conference calls. The processor arrangement 190 is coupled to the wireline network interface 210, to the radio frequency modulator/demodulator 205 and to the user interface 215. As explained in greater detail below, the processor arrangement 190 may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor, or arrangement of processors, microprocessors, controllers, or some other grouping of integrated circuits which perform the functions discussed in greater detail below. For example, in the preferred embodiment, the processor arrangement 190 is implemented as illustrated in FIG. 3, and includes an audio/video compression and decompression subsystem 265 and a microprocessor subsystem 260. As discussed in greater detail below, the methodology of the present invention may be programmed and stored, as a set of program instructions for subsequent execution, in the processor arrangement 190 and its associated memory and other equivalent components. In the preferred embodiment, the processor arrangement 190 is utilized, in conjunction with a stored set of program instructions and in response to any control signals entered by the user or received from the network 140, first, to convert the received protocol signal (from the wireline network interface 210) both to a baseband output video signal (to be modulated by the RF modulator/demodulator 205 and transmitted to a video display 225) and to an output audio signal (transmitted to the audio 220, or combined with the baseband output video signal and modulated and transmitted to the video display 225, or both); and second, to convert both a baseband input video signal (the demodulated input video signal having originated from the camera interface 235) and an input audio signal (from the audio 220 or combined with the baseband input video signal having originated from the video camera 230 and the camera interface 235), to the second protocol signal (to be modulated or formatted and transmitted by the wireline network interface 210 to the network 140). The functions of each of the components of the video access apparatus 110 are discussed in greater detail below with reference to FIGS. 3–12.

FIG. 3 is a high level block diagram illustrating a second embodiment of a video access apparatus, namely, video access apparatus 150, and illustrating a second embodiment of a video conferencing system 300, in accordance with the present invention. The second apparatus embodiment, namely, the video access apparatus 150 illustrated in FIG. 3, is a preferred apparatus embodiment of the invention, and is in all other respects equivalent to and may be utilized in a manner identical to the first embodiment, video access apparatus 110, illustrated in FIGS. 1 and 2, and the third embodiment, video access apparatus 160, illustrated in FIG. 15. Similarly, the second embodiment of the video conferencing system, video conferencing system 300, is also a preferred system embodiment of the present invention, and is in all other respects equivalent to and may be utilized in a manner identical to the first and third embodiments, video conferencing system 200 or 170, illustrated in FIGS. 2 and 15.

As illustrated in FIG. 3, the video access apparatus 150 includes a microprocessor subsystem 260 and an audio/video compression and decompression subsystem 265, which form the processor arrangement 190 discussed above with reference to FIG. 2. The video access apparatus 150 also includes an ISDN interface 245 and a telephony interface 250 (which individually or in combination equivalently function as the wireline network interface 210 illustrated in FIG. 2), a user audio interface 255 (which equivalently functions as the user interface 215 illustrated in FIG. 2); and an RF modulator 270 and RF demodulator 275 (which together equivalently function as the RF modulator/demodulator 205 illustrated in FIG. 2). In this preferred embodiment, the first communication channel 103 includes an ISDN or other digital line 105, coupleable to the ISDN interface 245, and a telephony (POTS) line 107, coupleable to the telephony interface 250. Depending upon the desired embodiment, discussed below with reference to FIG. 4, both the ISDN interface 245 (and corresponding digital line 105) and the telephony interface 250 (and corresponding telephony line 107) do not need to be included, as one or the other is sufficient. For example, a user or subscriber who does not desire an ISDN connection may choose an implementation of the video access apparatus 150 having only a telephony interface 250 (and corresponding telephony line 107), without an additional ISDN interface 245 (and corresponding digital line 105). The preferred embodiment of the video access apparatus 150 illustrated in FIG. 3 also includes a line or connector 115 for connection to a television antenna or to cable television for input of a television broadcast, cable television or other video; a filter 285; and a directional coupler 290. The functions of each of these components is explained in greater detail below.

Also as illustrated in FIG. 3, the second embodiment of a video conferencing system 300 includes one or more telephones $295_1$ through $295_n$ (individually and collectively referred to as telephone(s) 295, and which telephones 295 equivalently function as the audio 220 illustrated in FIG. 2); the video access apparatus 150; a video camera 230; a camera interface 235 (which also may be combined or incorporated within the video camera 230); one or more televisions $240_1$ though $240_n$ (which are individually and collectively referred to as television(s) 240, and which equivalently function as the video displays 225 illustrated in FIG. 2); and a second communications channel 227 which, as mentioned above, is preferably a coaxial cable in the user (or subscriber) premises.

Referring to FIG. 3, the video access apparatus 150 provides both telephony (POTS) and audio/video conferencing service using common household appliances for interaction with the user (or subscriber) in the video conferencing system 300, such as telephones $295_1$ through $295_n$ for entry of control signals and for audio input and output; video camera 230 for video input (such as a video camcorder); and television(s) 240 for video output (as or in lieu of video displays 225). When providing POTS service, the video access apparatus 150 interfaces with the typical, existing twisted-pair cabling 294 in the user (or subscriber) premises so that any telephone in the user premises, such as telephones $295_1$ through $295_n$, may be used. The video access apparatus 150 also provides line current and traditional "BORSHT" functions for typical (POTS) telephone service, as explained in greater detail below.

When providing video conferencing service, any of the plurality of telephones $295_1$ through $295_n$ (individually and collectively referred to as telephone(s) 295) may be used for call (conference) establishment or set up and for audio input and output. The radio frequency output video signal (from the video access apparatus 150) may be displayed on any of the televisions 240 connected to the second communication channel 227 (such as a CATV coaxial cable) within the user premises, using any channel (when not connected to cable TV) or using any vacant channel within the CATV downstream frequency band (for example, channel 3 or 4). The radio frequency output video signal is originally received via the first communication channel 103 from the network 140 in a modulated or formatted digital form, such as digital data modulated and encoded utilizing one or more protocols such as H.32x, and Q.x or V.x, which may be referred to as a received or first protocol signal. The first protocol signal is received over the first communication channel 103 of the audio/video network 100, having been transmitted via, for example, the network 140, from another, second user premises. The first protocol signal, typically consisting of encoded/modulated and compressed digital data, is received by the video access apparatus 150, which decodes/demodulates and decompresses the data and converts it to a baseband output video signal, such as an NTSC/PAL composite video signal (NTSC being a video format typically utilized in North America and Japan, with PAL being a video format typically utilized in Europe). Other video formats may also be used, such as SECAM (typically used in France) or HDTV (high definition television formats). This baseband output video signal (on line 271) is then RF modulated (using RF modulator 270) onto an available video RF carrier and injected into the second communication channel 227 (e.g., coaxial cable) at the user premises using a directional coupler 290 (preferably 4 port). The radio frequency output video signal is then sent to all television receivers, such as televisions 240, within the user premises, such as a home or office. The directional coupler 290 is used in the preferred embodiment to provide directional signal injection while providing isolation with any connected CATV network (which may be coupled via line 115).

The video signal originating in the user premises and to be transmitted via the network 140 to another, second user premises (or any other location), originates from a video camera (or camcorder) 230 that produces a video signal, such as an NTSC/PAL composite video signal, which is also preferably modulated on channel 3 or 4 (61.25 or 67.25 MHz). This RF video signal from the video camera 230 is connected or coupled to a camera interface 235, which utilizes an offset mixer to shift the RF video signal (typically on a 61.25 or 67.25 MHz carrier) up to a spectrum higher than typical CATV frequencies, such as the 1.2 GHz or 900 MHz bands, to avoid interfering with the radio frequency output video signals or other CATV downstream channels. When the video access apparatus is not connected to CATV, such offset mixing may be unnecessary and the camera interface 235 may be omitted from the system 300, provided interference with the downstream radio frequency output video signals may be avoided (for example, utilizing downstream transmission on channel 9 and upstream (input) transmission on channel 3 or 4). For those video cameras 230 which may not include a modulator to shift the NTSC/PAL composite video signal to channel 3 or 4, such modulation may be incorporated into the camera interface 235; conversely, the functions of the camera interface 235 may also be incorporated directly into the video camera 230. The shifted (offset mixed) video signal from the camera interface 235 (or unshifted video signal directly from the camera 230, if CATV or other downstream interference is not an issue), referred to herein as a radio frequency input video signal, is then injected into the same second communication channel 227 (also connected to the televisions 240) and transmitted to the video access apparatus 150. The video access apparatus 150 receives the radio frequency input video signal via the directional coupler (preferably at 1.2 GHz or 900 MHz) and demodulates the signal to baseband using RF demodulator 275, to form a baseband input video signal (on line 272). The baseband input video signal is then converted to digital form and compressed, to form a second protocol signal, such as a H.32x encoded video signal, and is transmitted (to form a transmitted protocol signal, which preferably also has further encoding and or modulation, such as a further Q.x or V.x encoded signal) over the audio/video network 100 via first communication channel 103. In the preferred embodiment, by using a vacant video channel at 1.2 GHz or 900 MHz, interference with any applicable downstream and upstream video, television, or CATV services tends to be avoided. The 1.2 GHz or 900 MHz signal is also filtered out of the feed-through cable or link 287 by a low pass filter 285, so that the signal is highly attenuated before it may leave the video access apparatus 150 through any cable which may be attached via line 115.

While the primary function of the video access apparatus 110 (or 150) and the video conferencing system 200 (or 300) is to provide full-duplex video communications, other secondary functions are also available in the preferred embodiment. For example, one such secondary function is a "loop back function" which allows the user to view the video from the video camera 230 on the screen of a television 240 or video display 225, such that the RF input video signal is demodulated (from 1.2 GHz or 900 MHz), remodulated onto a video RF carrier (that is tunable or receivable by the televisions 240), and utilized for an RF output video signal. Such a loop back feature is especially valuable for surveillance, such as for home security or for baby monitoring. Also, a picture-in-picture (or multiple window) function may be provided, in which a user may view a small window of the video from video camera 230 along with the received video from another location, for example, to provide baby monitoring within the small window while simultaneously watching a movie or video received from a CATV network, or to provide a self-view for viewer feedback concerning the positioning of the viewer's own video camera 230.

In addition, the video access apparatus 110 (or 150) may be frequency agile, such that video conferencing may occur on any channel. While video conferencing on typically empty television or cable channels such as channels 3 or 4 may be preferable, in accordance with the present invention, video conferencing on additional channels is also feasible. For example, an existing video channel may be blanked out or eliminated, utilizing a notch filter, for any length of time, and the various input and output video signals inserted or overlaid into the now empty (filtered or muted) channel. Such frequency agility and injection of an audio/video signal, in the presence of existing programming, is one of many truly unique features of the present invention.

FIG. 4 is a block diagram illustrating a wireline network interface 210 of the preferred apparatus embodiment in accordance with the present invention. As indicated above, the wireline network interface 210 preferably is comprised of both an ISDN (digital) interface 245 and a telephony (or analog) interface 250, although either alone (digital or analog interface) is sufficient. As discussed in greater detail below, the first and second protocol signals, preferably encoded utilizing H.32x and further encoded/modulated utilizing either Q.x or V.x protocols, are transported to and from the network 140 through one or both of these interfaces 245 and 250. Referring to FIG. 4, utilizing an ISDN (digital) interface 245, connection to an ISDN or other digital network via line 105 is made through a jack 305 which may be, as discussed in greater detail below with reference to FIGS. 5 and 6, for example, an RJ 45jack or an RJ 11 jack, depending upon the service provided by the digital network. Coupled to the jack 305 is an isolation transformer circuit 310, which is further coupled to an ISDN transceiver 315 (which, as discussed below, may be either an S/T transceiver $315_a$ or a U transceiver $315_b$). The ISDN transceiver 315, in turn, is coupled to the microprocessor subsystem 260 via a synchronous serial interface portion of bus 261.

FIG. 5 is a block diagram illustrating an ISDN S/T interface $245_a$ for use with pre-existing ISDN service. For example, a digital network service provider may typically bring a twisted pair line to the outside of a subscriber's premises, and install an ISDN interface. As a consequence, when there is a pre-existing ISDN NT1 interface, such as interface 306 (having an NT1 function for two to four wire conversion), appropriate connection to the existing NT1 interface should be made utilizing an ISDN S/T interface $245_a$. As a consequence, as illustrated in FIG. 5, the jack 305 is implemented as an RJ 45 jack $305_a$, the isolation transformer circuit 310 is implemented as an S/T dual isolation transformer $310_a$, and the ISDN transceiver 315 is implemented as an ISDN S/T transceiver $315_a$ (such as a Motorola MC145574 integrated circuit).

FIG. 6 is a block diagram illustrating an ISDN U interface $245_b$ for use when there is no pre-existing ISDN service (having an installed NT1 interface). In this implementation, the jack 305 is implemented as an RJ11 jack $305_b$, the isolation transformer circuit 310 is implemented as a U isolation transformer $310_b$, and the ISDN transceiver 315 is implemented as an ISDN U transceiver $315_b$ which also performs a NT1 function (such as a Motorola MC145572 integrated circuit).

Referring to FIG. 4, for digital service, the ISDN interface 245 consists of an ISDN transceiver 315, such as the Motorola MC145574 or MC145572, and an isolation transformer circuit 310, which provide the layer one interface for the transportation of two 64 kbps B channels and one 16 kbps D channel between the network 140 termination (jack 305) and the microprocessor subsystem 260, preferably performing certain portions of the ISDN protocols, namely, Q.910 physical layer and Q.921 LAPD data link protocols. The ISDN transceiver 315 provides the modulation/line transmit and demodulation/line receive functions, as well as activation, deactivation, error monitoring, framing, and bit and octet timing. The ISDN transceiver 315 interfaces with the microprocessor subsystem 260 over a synchronous serial interface (SSI) portion of the bus 261. As discussed in greater detail below, the microprocessor subsystem 260 performs the Q.931 message signaling ISDN protocol and provides overall control of all subsystems within a video access apparatus 110 or 150, while the audio/video compression and decompression subsystem 265 performs the H.32x protocols.

Continuing to refer to FIG. 4, for analog service, the telephony (or analog) interface 250 performs analog modem functions, operating, for example, as a V.34 or V.34bis modem. Connection to an analog network, via a telephony (POTS) line 107, is made via a jack 320, which is typically an RJ11 jack. Connected to the jack 320 is a dial (or data) access arrangement (DAA) 325, which receives an analog signal transmitted on the analog telephony line 107. DAAs are known in the prior art and may be made of a variety of discrete components, including analog multiplexers, resistors, capacitors, and operational amplifiers, or may be embodied in whole or part as an integrated circuit, such as a Cermetek CH1837, and performs such functions as impedance matching, power level adjustment, isolation, surge voltage protection, and ring detection functions. Connected to the DAA 325 is a codec (coder-decoder) 330, such as a Motorola MC145500 integrated circuit (or, equivalently, an analog-digital (A/D) converter) which converts an analog signal received from the line 107 to sampled, digital form, and converts sampled, digital information to analog form for transmission over the line 107. The codec 330 is also referred to as a network codec 330, to distinguish it from a second codec, the audio codec 410, utilized in the user audio interface 255. The network codec 330 interfaces with a voice digital signal processor (DSP) 415 (of the user audio interface 255), also over a synchronous serial interface (SSI) portion of the bus 261. The network codec 330 performs V.x functions when in video mode, and voice functions when in telephony mode, as discussed in greater detail below. When utilized in this analog modem role (V.x functions), the voice DSP 415 operates in conjunction with the video processing DSP 365 (of the audio/video compression and decompression subsystem 265) utilizing a set of modem program instructions under the control of the microprocessor subsystem 260. The audio/video compression and decompression subsystem 265 also performs H.32x compression and decompression of the various input and output audio and video signals. This telephony interface 250 is used in the preferred embodiment for V.x modem functions during a video telephony call, and analog audio functions during a typical voice (POTS) call.

FIG. 7 is a block diagram illustrating a microprocessor subsystem 260 of the preferred apparatus embodiment in accordance with the present invention. The microprocessor subsystem 260 consists of a microprocessor 350 or other processing unit, such as the Motorola MC68LC302, and memory 360, which includes random access memory (RAM) and readonly memory (ROM), and in the preferred embodiment, also includes flash programmable memory (such as flash EPROM or $E^2$PROM), with communication provided over the bus 261 to the ISDN interface 245, the user audio interface 255 (and voice DSP 415), and the audio/video compression and decompression subsystem 265. The read only memory portion of memory 360 also utilizes flash programmable memory, such that the memory contents may be downloaded over the audio/video network 100. As a consequence, different versions of operating software (program instructions), such as upgrades, may implemented without modifications to the video access apparatus 150 and without user intervention.

Continuing to refer to FIG. 7, the microprocessor subsystem 260 provides device control and configuration, call processing, and is also used to implement an ISDN protocol stack when required for video calls, such as Q.931 message signaling. Because the microprocessor subsystem interfaces with the ISDN interface 245 and the telephony interface 250 (via the voice DSP 415), a high speed data link may be established between the network 140 and the audio/video compression and decompression subsystem 265 using the microprocessor subsystem 260 as the data exchange and protocol conversion device. User audio, in the form of a pulse code modulated (PCM) data stream, may also be routed through the microprocessor 350 to the audio/video compression and decompression subsystem 265 from the voice DSP 415 of the user audio interface 255.

FIG. 8 is a block diagram illustrating an audio/video compression and decompression subsystem 265 of the preferred apparatus embodiment in accordance with the present invention. The audio/video compression and decompression subsystem 265 performs video compression of the baseband input video signal (originating from the video camera 230 and camera interface 235) and audio compression of the input audio signal (from the user audio interface 255), and decompression of the audio and the video data of the received, first protocol signal (the first protocol previously having been decoded and/or demodulated) for subsequent display on the television(s) 240, all preferably utilizing the H.32x family of protocols. The audio/video compression and decompression subsystem 265 includes a video processing digital signal processor (DSP) 365, a red-green-blue digital to analog converter 370, a red-green-blue analog to digital converter 390, an encoder 375, and an audio/video input processor 380. The video processing DSP (or video processing DSP subsystem) 365 is a high-speed programmable DSP (or DSP arrangement or subsystem, such as a Motorola DSP56303 with associated support components, including memory and a hardware acceleration ASIC (discussed below), utilized to implement different video and audio compression and decompression algorithms, depending on the transmission rate and/or video conferencing standard at the remote end (i.e., the other premises with which the video access apparatus is communicating). The program code for the video processing DSP 365 may also be downloaded from the microprocessor subsystem memory 360, which may also be downloaded by a service provider through the audio/video network 100. As a consequence, video functionality of the video access apparatus 150, including new algorithms, may be changed or upgraded on-the-fly, also without any hardware changes and without user intervention.

Continuing to refer to FIG. 8, compressed audio/video data received from the network 140 (as, for example, H.32x encoded protocol signals), via the ISDN interface 245 and the microprocessor subsystem 260, or via the telephony interface 250 with the voice DSP 415 and the microprocessor subsystem 260, is transferred to the video processing DSP 365 where it is decompressed, with video also converted to red-green-blue ("RGB") digital video signals, and with decompressed audio transferred to the user audio interface 255 (or modulated for transmission to the televisions 240). The RGB digital video signals are then converted to RGB analog signals, by the RGB digital to analog ("D/A") converter 370, such as the Motorola MC44200. The analog RGB signals, along with a composite synchronization signal, are then applied to an encoder 375, preferably an NTSC/PAL encoder such as a Motorola MC13077, resulting in an NTSC/PAL composite video signal, which may also be referred to as a baseband output video signal. The NTSC/PAL composite video signal is then transferred to the RF modulator 275 for upconversion to a radio frequency (to form the radio frequency output video signal), followed by transmission on the second communications channel 227 and display on a television 240.

For subsequent transmission over the network 140 of an input video signal (originating from the video camera 230 and the camera interface 235), a baseband input video signal, such as an NTSC/PAL composite video camera or camcorder signal, is received from the RF demodulator 270. The baseband input video signal is transferred to an audio/video input processor 380, such as a Motorola MC44011, which converts the baseband input video signal to analog RGB signals, while also providing a genlocked sampling clock for subsequent digitizing of the video signals. These input analog RGB signals are then converted to digital RGB signals by a RGB analog to digital converter 390, such as the Motorola MC44250, and transferred to the video processing DSP 365. The video processing DSP 365 compresses the digital RGB signals and audio data (from the user audio interface 255), preferably utilizing an H.32x protocol, and transfers the resulting data stream to the microprocessor subsystem 260 for additional analog or digital processing. It should be noted that as part of the H.32x protocol, audio information originating from the user audio interface 255 or from the video camera 230 (and camera interface 235) is compressed and combined with compressed video data before transmission to the network 140 via the wireline network interface 210. For subsequent digital transmission, the microprocessor subsystem 260 encodes the compressed audio/video data utilizing the Q.931 ISDN message signaling protocol, and transfers the processed data to the ISDN interface 245, for additional ISDN protocol processing and transmission over the first communication channel 103. For subsequent analog transmission, the microprocessor subsystem 260, the voice DSP 415 (of the user audio interface 255) and the video processing DSP 365 encode the compressed audio/video data utilizing analog protocols such as the V.x series of protocols, and transfer the processed data to the telephony interface 250, for additional V.x protocol processing and transmission over the first communication channel 103. In the preferred embodiment, the audio/video compression and decompression subsystem 265 may also include additional random access memory for use by the video processing DSP 365 for partial or full storage of pixel data of an input/output video frame. Also in the preferred embodiment, a hardware acceleration ASIC is used to assist the video processing DSP 365 in processing speed intensive tasks, such as discrete cosine transforms associated with the compression and decompression processes.

FIG. 9 is a block diagram illustrating a user audio interface 255 of the preferred apparatus embodiment in accordance with the present invention. The user audio interface 255 is designed to interface with standard household telephone sets, including wireless devices and speaker phones, such as telephones $295_1$ through $295_n$. The user audio interface 255 is intended to support both audio POTS calls and video calls. In the preferred embodiment, POTS calls are processed in a "transparent" mode, such that placing and receiving telephone calls occur as if no video call functions were present. Also in the preferred embodiment, video calls are processed as an exception, requiring a designated or predetermined dialing sequence entered by the user to invoke a video call.

Referring to FIG. 9, a SLIC (Subscriber Loop Interface Circuit) 400 provides "BORSHT" functions for telephone service within the user premises, such as that normally provided by a network central office, including DC (direct current) power for the telephone (Battery); Overvoltage protection; Ring trip detection and facilitation of ringing insertion; Supervision features such as hook status and dial pulsing; Hybrid features such as two-wire differential to four-wire single-ended conversions and suppression of longitudinal signals at the two-wire input; and Testing. The SLIC 400 communicates with the telephones $295_1$ through $295_n$ through an ordinary telephone line, such as twisted pair cabling 294, which has tip and ring lines. The ring generator 405 provides high-voltage AC (alternating current) signals to ring the telephones $295_1$ through $295_n$. Connected to the SLIC 400, the audio codec 410 provides analog-to-digital conversion for voice digitizing of the input (voice) audio signal originating from the microphone portion of one or more of the telephones $295_1$ through $295_n$, to form an input (PCM) digital voice data stream or signal, and digital-to-analog conversion for voice recovery from an output (PCM) digital voice data stream or signal (to create the output audio signal to the speaker portion of the telephones $295_1$ through $295_n$), and well as band limiting and signal restoration for PCM systems. The output and input (PCM) digital voice data streams connect directly to the voice processing DSP 415. The voice processing DSP 415, such as a Motorola DSP56303, contains program memory and data memory to perform signal processing functions such as DTMF/dial pulse detection and generation, analog modem functions, call progress tone (dial tone, busy tone) generation, PCM-to-linear and linear-to-PCM conversion, and speech prompt playback. As indicated above, the voice processing DSP 415 also provides modem functions, such as V.x modem functions, to additionally support POTS or other analog-based video calls. The voice processing DSP 415 interfaces with the microprocessor subsystem 260 and network codec 330 over the bus 261. The memory 420 (connected to the voice processing DSP 415), in the preferred embodiment, includes high density read only memory (referred to as speech ROM) containing PCM encoded (or compressed) speech segments used for interaction with the user, such as in prompting the user for keypad DTMF or dial pulse entry when in the video calling mode. In addition, optional speech random access memory may be used for user voice storage functions, and electrically alterable, programmable non-volatile (flash) memory for storage of programs (and updates) or algorithms.

The user audio interface 255, in the preferred embodiment, operates in one of two modes, first, for telephony (POTS), and second, for video conferencing (calling). The telephony (POTS) mode is user transparent, as a default mode which is entered whenever the user goes off hook. As discussed in greater detail below, the video conferencing mode is entered as an exception, through the user entering (dialing) a specific, predetermined sequence which, in the preferred embodiment, is not recognized as a telephony sequence. In the telephony (POTS) mode, the voice processing DSP 415 generates the customary "dial" tone when the user telephone (of the telephones $295_1$ through $295_n$) goes off hook. The user then enters the dialing sequence via the keypad of a telephone 295, just as in known or customary telephone dialing. The voice processing DSP 415 decodes the dialing digits and stores them in a calling memory buffer of memory 420. Upon decoding the first two digits entered (which are not the first two digits of the specific predetermined video call sequence), the voice processing DSP 415 recognizes that the requested call is not a video call and, as a consequence, signals the microprocessor subsystem 260 to initiate a POTS call through the audio/video network 100 using the telephony (analog) interface 250. When the call is granted (by the network 140) and the audio link with the local digital or analog switch 135 is established, the voice processing DSP 415 forwards the stored digits to the local digital or analog switch 135 and connects the audio paths between the user's telephone(s) and the network 140. From this point on, the voice processing DSP 415 will not decode any dialed digits and will simply pass through the input and output PCM digital voice data stream, until the user's telephone goes on hook and the call is terminated.

Alternatively for a telephony session, the audio/user interface 255 may create or maintain a connection to a central office of a network 140, to provide transparency for telephony. Once the entry of the specific predetermined sequence for video mode is detected, the audio/user interface 255 breaks or terminates the central office connection, and enters video mode, under local control of the video access apparatus 150 (or 110).

As indicated above, the user initiates the video conferencing mode as an exception to the normal telephony mode, by entering a specific predetermined sequence which is recognized by the voice processing DSP 415 as a non-telephony sequence and, additionally in the preferred embodiment, as the predetermined sequence specific to the video mode. This methodology is also discussed below with reference to the flow chart of FIG. 14. For the video conference mode of the preferred embodiment, the first two digits of the specific, predetermined sequence are unique and specifically unused in a standard POTS call, such as "* *", and as a consequence, may specifically signal the audio voice processing DSP 415 to enter the video call mode. Alternatively, other specific, predetermined sequences could be programmed by the user for recognition as a video conference mode by the voice processing DSP 415. Immediately after decoding the two special digits or other specific predetermined sequence, the voice processing DSP 415 generates or plays a speech prompt sequence, such as "Please select a call option or press the '#' key for help", which is stored in the speech ROM portion of memory 420. The action taken by the voice processing DSP 415 will then depend upon the sequence entered or key pressed by the user following the initial prompt. For example, if the '#' key is pressed, the user may hear a menu of commands such as, for example, the following:

"To place a Directory call, press *"
"To update the call Directory, press 2"
"To place a manual video call, press 3"
"To mute the camera, press 4"
"To view the camera on your television, press 5"
"To hear this menu again, press #'

Thus, in the preferred embodiment, an automated and user friendly prompting sequence is used to guide the user through placing a video conference call. Once the entry is complete, the information is then passed from the voice processing DSP 415 to the microprocessor subsystem 260, which will then attempt to connect the call through the network 140. If successful, the audio paths (input and output audio signals) will be connected through to the telephones $295_1$ through $295_n$, the output video path will be connected through to the televisions $240_1$ through $240_n$ (or other video displays 225), and the input video path will be connected from the camera interface 235 (originating from the video camera 230). Alternatively, under user or other control, the output audio path may also be connected to a television 240, for broadcast over the speakers within the television(s) 240, and the input audio path may also originate from a microphone within the video camera 230 and be connected via the camera interface 235. This alternate path may be particularly useful when the user desires to video tape the video conference, for example, utilizing an ordinary VCR coupled to the television 240. The video call terminates when the telephone goes on hook, or another control signal is entered via the user interface 215 or user audio interface 255.

It should be noted that in the preferred embodiment, a simple directory feature may be used to simplify the video calling process. For example, after the user goes off hook and presses the '*' key three times followed by a single digit '1', '2' . . . '9', a call automatically may be placed using a sequence of numbers stored in the directory for that digit. This feature may be necessary or desirable under a variety of circumstances, for example, when an ISDN call may require the entry of two separate 10-digit numbers to connect the call through the network 140. Also as an option in the preferred embodiment, a more sophisticated system may store a simple name tag or other alphanumeric entry associated with the directory entry, created by the user, and played back to the user by the voice processing DSP 415. For example, a prompt in response to making a directory call may be: "To call 'grandma', press 1"; "To call 'mother', press 2"; "To call 'work', press 3"; in which the speech segments "grandma", "mother", and "work" are spoken by the user, recorded and stored in memory 420. More sophisticated systems may include speaker/voice recognition techniques, to recognize the user selection, eliminating the need to press any keys on a telephone keypad or other manual entry of information into the user interface 215 or user audio interface 255. It should also be noted that video call control functions, such as camera muting, unmuting, and local playback (loop back), also may be selected with the same user interface. Other sophisticated systems may also include use of the video display 225 or television 240 for on-screen visual display of a menu of options, with corresponding entry of user control signals, such as call control and placement information, occurring in a variety of ways, such as through the keypad of the telephones 295, through a infrared remote control link with the video access apparatus 150 (or 110), or through the input video path via the second communication channel 227. In this manner, the keypad or remote control link, coupled with the video display, may effectively form a distributed graphical user interface for call control. These various methods of user prompting, on-screen display, and user feedback are especially useful to guide the user through the process of placing a video call, and help to make the audio video conferencing system 300 (or 200) especially user-friendly. In addition, these various methods also illustrate the "tri-ality" of the use of a telephone 295 in the preferred embodiment, for telephony, for audio input and output, and for call control.

FIG. 10 is a block diagram illustrating an RF modulator 270 of the preferred apparatus embodiment in accordance with the present invention. The RF modulator 270 converts the baseband output video signal from the audio/video compression and decompression subsystem 265, such as an NTSC/PAL composite video signal, to a radio frequency output video signal, such as an amplitude modulated vestigial sideband RF signal, which may be viewed via the receiver of the user's television 240, for example, when tuned to channel 3 or 4. The RF modulator 270 may be implemented in a variety of ways, including through use of a video modulator 425, such as a Motorola MC1373, followed by a gain stage (amplifier) 430, utilized in the preferred embodiment to overcome losses from the directional coupler 290 which feeds the RF output video signal into the second communication channel 227, such as a coaxial cable system in the user premises. A switchable notch filter may also be used to remove current programming from a particular channel (RF video carrier), while inserting the radio frequency output video signal into the second communication channel 227.

Figure 11:
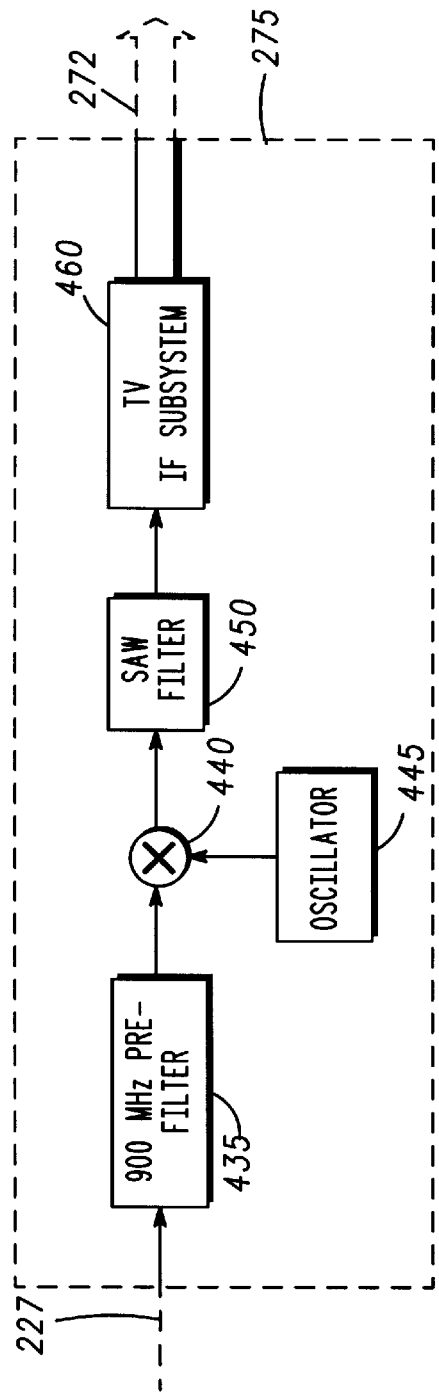
FIG. 11 is a block diagram illustrating an RF demodulator of the preferred apparatus embodiment in accordance with the present invention.

FIG. 11 is a block diagram illustrating an RF demodulator 275 of the preferred apparatus embodiment in accordance with the present invention. In the preferred embodiment, the RF demodulator 275 is a full heterodyne receiver tuned to a specific channel in the 900 MHz band or 1.2 GHz band, to receive the radio frequency input video signal from the camera interface 235 (originating from the video camera 230). The radio frequency input video signal, fed into the RF demodulator 275 from the directional coupler 290, is bandpass filtered (at either 900 MHz or 1.2 GHz) in pre-filter 435, then mixed down to an intermediate frequency (IF) of, for example, 45 MHz, using the mixer 440 and a fixed reference oscillator 445. The signal is then surface acoustic wave (SAW) filtered by the SAW filter 450, or otherwise bandpass filtered, and transferred to a (color) TV IF subsystem 460, such as a Motorola MC44301, which provides amplification, AM detection (demodulation) and automatic fine tuning, resulting in a baseband input video signal (baseband composite input video signal). This baseband input video signal is then transferred to the audio/video compression and decompression subsystem 265 for further processing as discussed above.

Figure 12:
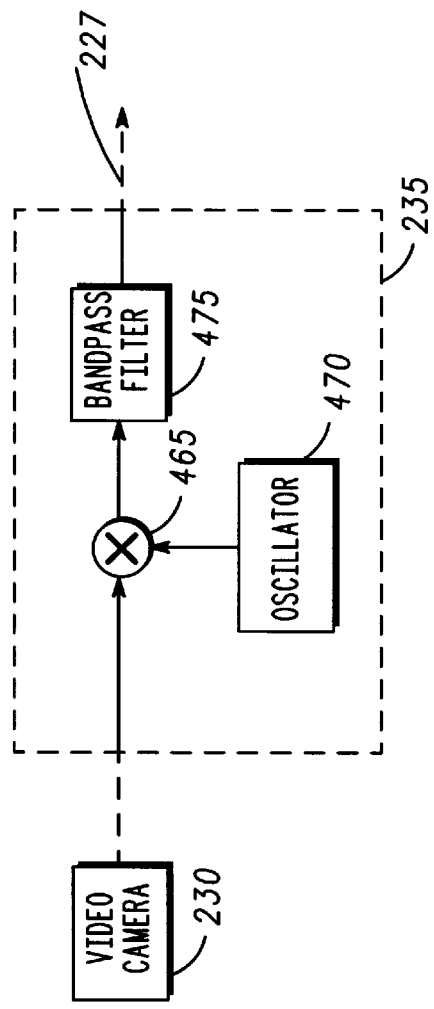
FIG. 12 is a block diagram illustrating a camera interface of the preferred apparatus embodiment in accordance with the present invention.

FIG. 12 is a block diagram illustrating a camera interface 235 of the preferred apparatus embodiment in accordance with the present invention. The camera interface 235 is used in conjunction with a video camera (or camcorder) 230 that outputs its signal as an RF video carrier on channel 3 or 4 (61.25 or 67.25 MHz), and is used to upconvert the video carrier to an RF carrier at 900 MHz or 1.2 GHz without intervening demodulation and modulation of the video signal. As mentioned above, the camera interface 235 may be omitted when the video access apparatus 150 (or 110) is not connected to CATV services and, in which case, the video camera 230 may be directly connected to the second communication channel 227 (provided that interference with the RF output video signal may be avoided, for example, by having the RF input video signal from the video camera 230 on a different channel than the RF output video signal from video access apparatus 150). As illustrated in FIG. 12, the input video signal from the video camera 230 is mixed up to the required output frequency using an offset mixer 465, a fixed reference oscillator 470, and a bandpass filter 475. Not illustrated in FIG. 12, if additional input video signals are desired from, for example, additional video cameras, the input video signals may also be multiplexed. This feature may be desirable, for example, when the system is to be used for surveillance of multiple points or locations, or when the user desires to transmit additional windows or screens within screens.

Alternatively, as mentioned above, the camera interface 235 may be directly incorporated within the video camera 230. In addition, for those video cameras producing a NTSC/PAL composite video signal (rather than an RF video carrier on channel 3 or 4), an additional stage may be added within the camera interface 235 to modulate the NTSC/PAL composite video signal to an RF video carrier prior to offset mixing by offset mixer 465, or in lieu of offset mixing, directly modulating the NTSC/PAL composite video signal to 900 MHz or 1.2 GHz to form the RF input video signal.

Figure 13:
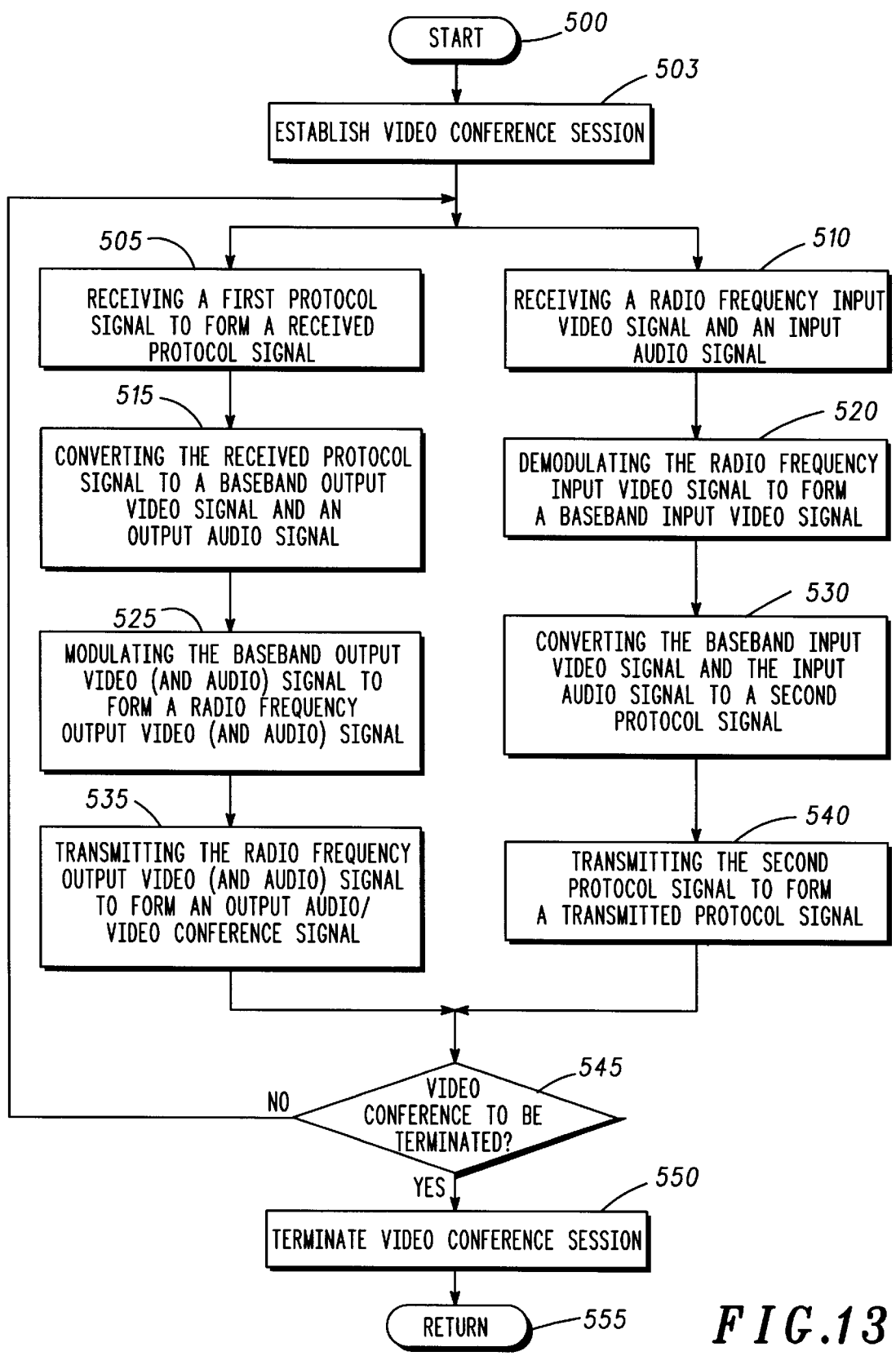
FIG. 13 is a flow diagram illustrating the method of the preferred embodiment in accordance with the present invention.

FIG. 13 is a flow diagram illustrating the method of the preferred embodiment of the present invention. As illustrated in FIG. 13, the method begins, start step 500, with establishing a video conference session, step 503, such as setting up the video call, either ISDN or POTS. As discussed above, the call may be established through the user audio interface 255, such as via DTMF dialing or menu selection, or as discussed below with reference to FIG. 15, the call may be established by network interactivity, such as via an intelligent peripheral ("IP") 125 within an intelligent network 115. Once the video conference call is set up, the method then proceeds to receiving a first protocol signal, such as a Q.x or V.x encoded/modulated H.32x audio/video signal, to form a received protocol signal, step 505. In the preferred embodiment, step 505 is performed in the wireline network interface 210. Next, in step 515, the received protocol signal is converted to a baseband output video signal and an output audio signal. In the preferred embodiment, step 515 is performed by the processor arrangement 190, or more particularly by the microprocessor subsystem 260 (and possibly voice DSP 415) and the audio/video compression and decompression subsystem 265. In the preferred embodiment utilizing audio 220 or telephones 295 for audio output and input, an important feature of the present invention is the independence of the output audio signal from the output video signal. In the event that a television 240 or other video display 225 is also to be used for audio output, the output audio signal may be combined with the baseband output video signal (rather than separating out the audio portion and separately routing it to audio 220 or telephones $295_1$ through $295_n$). Next, in step 525, the baseband output video signal (and possibly output audio signal as well) is modulated to form a radio frequency output video (and audio) signal, also referred to as a composite output video signal, and in step 535, the RF output video (and audio) signal is transmitted. In the preferred embodiment, steps 525 and 535 are performed by the RF modulator/demodulator 205 or the RF modulator 270. In addition, the output audio signal may also be a combination of both near end and far end (remote) audio, resulting in near and far end combined audio available at the television receiver. This combination would allow both recording and monitoring of the audio/video information, from both the near and far ends.

Concurrently with steps 505, 515, 525 and 535 (involving receiving (at a local location) video conference information transmitted from another location, such as a remote location), in the preferred embodiment, steps 510, 520, 530 and 540 are also occurring (involving transmitting (from a local location) video conference information to another location, such as a remote location). In step 510, a radio frequency input video signal and an input audio signal are received. As indicated above, in the preferred embodiment, the input video signal and input audio signal are each independent of the other. In the preferred embodiment, the radio frequency input video signal from the camera interface 235 (or directly from the video camera 230) is received by the RF demodulator 275 or the RF modulator/demodulator 205, and an input audio signal is received by either the audio 220 and user interface 215, or telephones $295_1$ through $295_n$ and user audio interface 255. Alternatively, the input audio signal may also be received by a microphone in the video camera 230 and included as part of the RF input video signal from the camera interface 235. Next, preferably in the RF demodulator 275 or the RF modulator/demodulator 205, in step 520 the RF input video (and possibly audio) signal is demodulated to form a baseband input video (and possibly audio) signal. In step 530, the baseband input video signal and the input audio signal are converted to a second protocol signal, preferably by the processor arrangement 190, or more specifically by the audio/video compression and decompression subsystem 265, the microprocessor subsystem 260, and the voice DSP 415. In step 540, the second protocol signal is transmitted to form a transmitted protocol signal, preferably by the wireline network interface 210. Following steps 535 and 540, when the video conference is to be terminated, step 545, such as by going on hook, the video conference session is terminated, step 550, such as through ISDN or other protocol call tear down or other call termination procedures, and the process may end, return step 555. As discussed in greater detail below, such call tear down procedures may be performed by the video access apparatus or by an IP 125 within an intelligent network 115. Conversely, if the video conference is not be terminated in step 545, the method continues, returning to steps 505 and 510.

Figure 14:
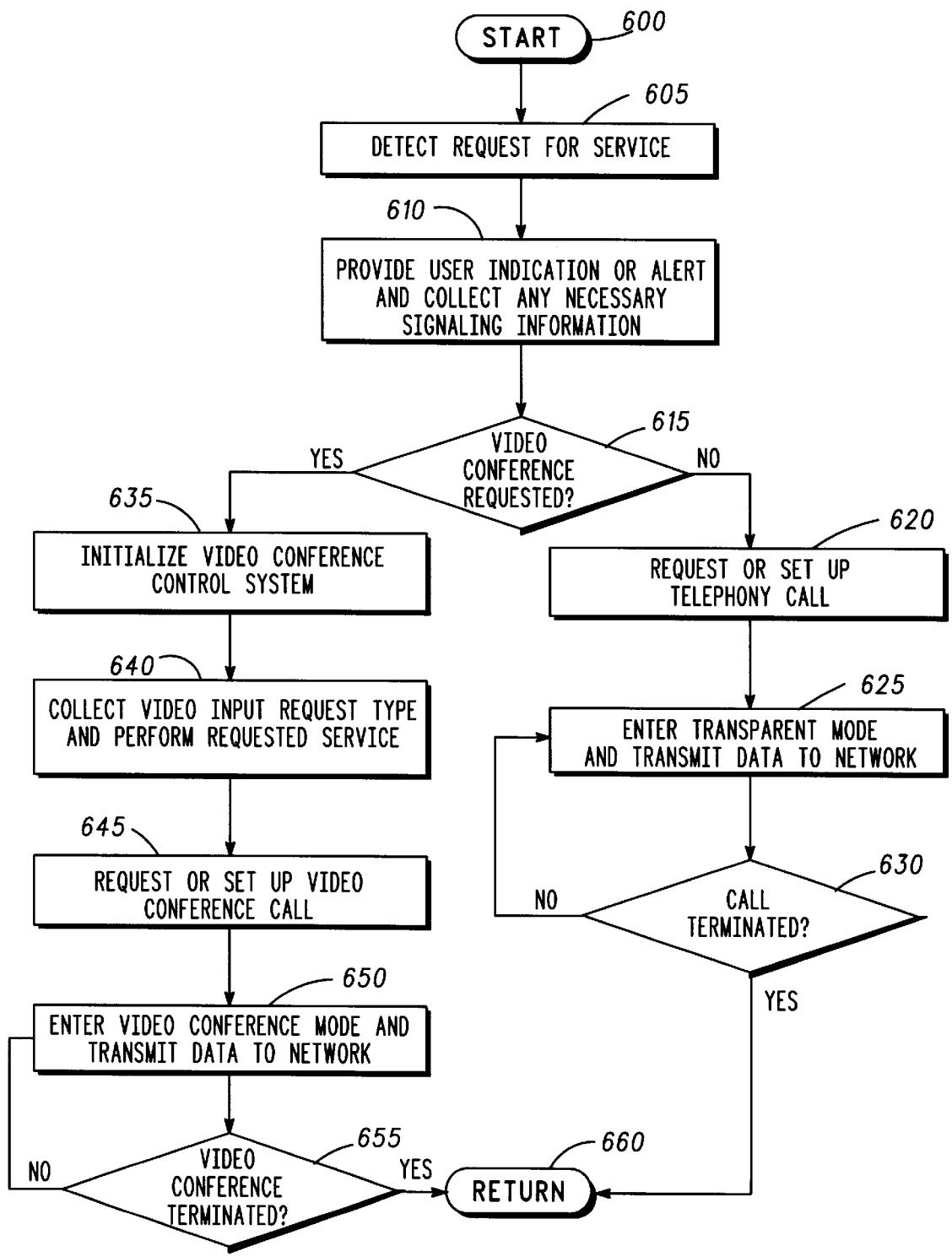
FIG. 14 is a flow diagram illustrating the telephony and video conference control methodology of the preferred embodiment in accordance with the present invention.

FIG. 14 is a flow diagram illustrating the telephony and video conference control methodology in accordance with the preferred embodiment of the present invention. FIG. 14 also illustrates the multiple roles of a telephone, such as telephones $295_1$ through $295_n$, in the system of the present invention, including providing telephony (POTS), providing video call control, and providing the audio portion of the video conference. Referring to FIG. 14, beginning with start step 600, a request for service is detected, step 605, such as going off hook or receiving an incoming alert signal. Next, in step 610, a user indication or alert is provided, such as a dial tone or an incoming ring signal, and signaling information is collected, such as DTMF digits of a phone number or "". When a video conference has been requested in step 615, such as through entry of "" or receipt of an incoming message from the network 140, then the method proceeds to step 635. When a video conference has not been requested in step 615, the method proceeds to request or set up a telephony call, such as generating DTMF tones and connecting an audio path between the user's telephone and the network 140, step 620, followed by entering the transparent telephony mode and transmitting audio (typically PCM) data to the network 140, step 625. The audio data will have been PCM encoded, and will have been transformed into an appropriate digital or analog format (e.g., ISDN, POTS, etc.) by the wireline network interface 210 for transmission to the network 140. When the telephony call is terminated, step 630, the method may end, return step 660.

Continuing to refer to FIG. 14, when a video conference has been requested in step 615, the method proceeds to step 635 and initializes the video conference control system, such as playing an initial speech prompt as discussed above. Next, in step 640, the video input request type is collected and the corresponding requested service is performed, such as originating a video conference call using a directory, updating a video conference call directory, manually originating a video conference call, muting an input (audio or video), providing loop back (e,g., local self-view such as monitoring or other surveillance), playing help or error messages or menu options, or exiting the video conferencing control system. In step 645, a video conference call is requested or set up (such as for an incoming video call), and in step 650, the video conference mode is entered, with protocol encoded (e.g., H.32x and either Q.x or V.x protocols) audio and video data being transmitted to the network 140. When the video conference call is terminated in step 655, such as by going on hook, the method may end, return step 660.

Also as discussed below with reference to FIG. 15, many of the steps illustrated in FIG. 14 may be performed by an IP 125 within an intelligent network. As illustrated in FIG.

14, all call establishment, mode selection, and call termination procedures may be performed by the IP 125, i.e., all steps other than the actual data transmission steps 625 and 650.

Figure 15:
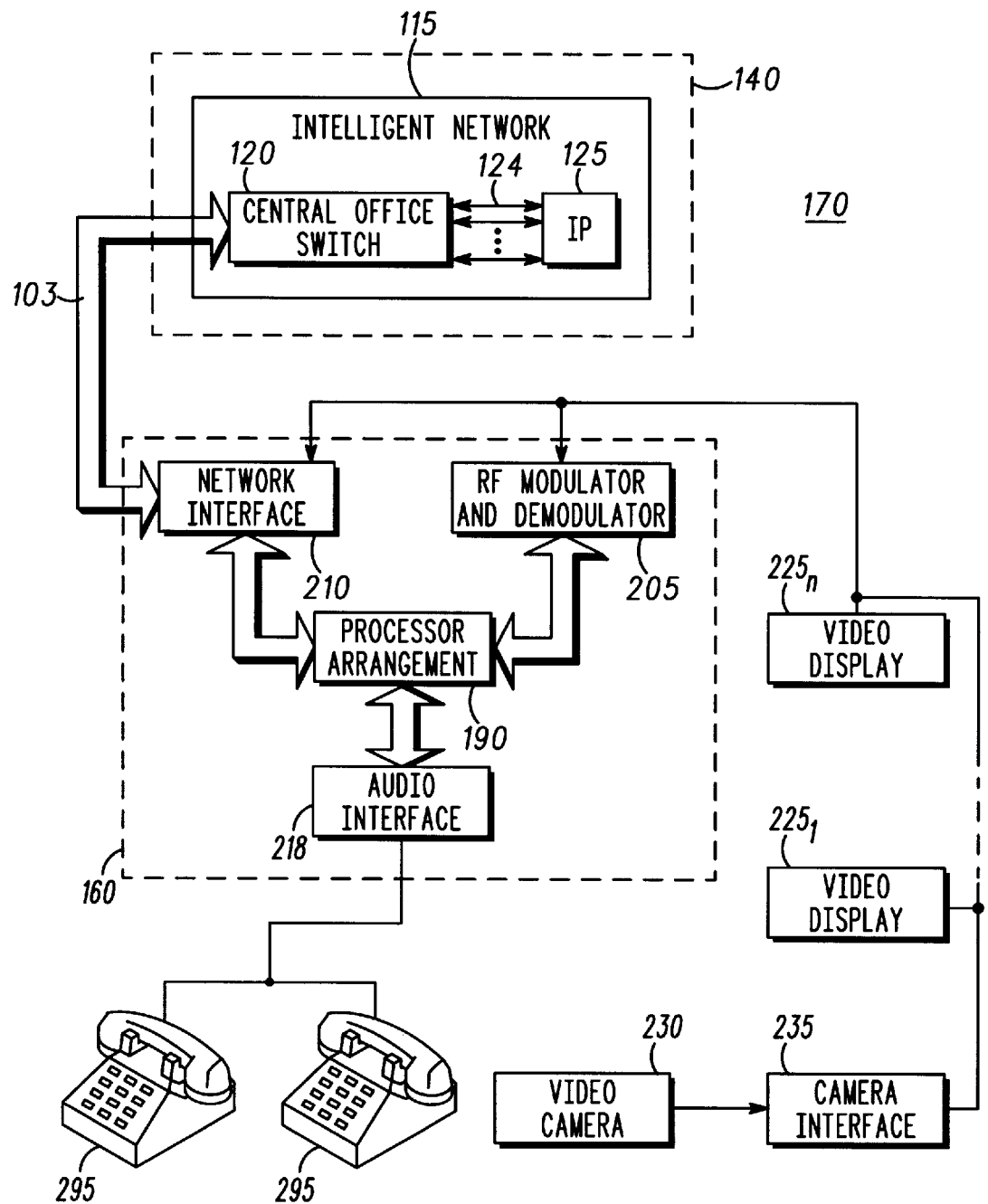
FIG. 15 is a block diagram illustrating a third embodiment of a video access apparatus and a third embodiment of a video conferencing system in accordance with the present invention.

FIG. 15 is a block diagram illustrating a third embodiment of a video access apparatus, namely, video access apparatus 160, and illustrating a third embodiment of a video conferencing system 170, in accordance with the present invention. The third apparatus embodiment, namely, the video access apparatus 160 illustrated in FIG. 15, is a preferred apparatus embodiment of the invention, and is in all other respects equivalent to and may be utilized in a manner identical to the first embodiment, video access apparatus 110, illustrated in FIGS. 1 and 2, and the second embodiment, video access apparatus 150, illustrated in FIG. 3. Similarly, the second embodiment of the video conferencing system, video conferencing system 170, is also a preferred system embodiment of the present invention, and is in all other respects equivalent to and may be utilized in a manner identical to the first and second embodiments, video conferencing system 200 or 300, illustrated in FIGS. 2 and 3.

As illustrated in FIG. 15, as in the other apparatus embodiments, the video access apparatus 160 includes a processor arrangement 190 (such as microprocessor subsystem 260 and an audio/video compression and decompression subsystem 265), a wireline network interface 210 (such as an ISDN interface 245 and a telephony interface 250), and an RF modulator/demodulator 205 (such as an RF modulator 270 and RF demodulator 275), all operating and functioning as discussed above. In lieu of a user interface 215 (FIG. 2) or a user audio interface 255, the video access apparatus 160 includes an audio interface 218 coupled to the processor arrangement 190. The audio interface 218 is also coupleable to one or more telephones 295 for audio input and output. The audio interface 218 may be embodied as illustrated in FIG. 9 for the user audio interface 255. As discussed in greater detail below, however, in this third embodiment, a significant portion of the functionality discussed above with respect to the user audio interface 255 is shifted into an intelligent peripheral 125 within an intelligent network 115 and, as a consequence, the audio interface 218 may be embodied utilizing components having lesser or simpler performance requirements as compared to the user audio interface 255; for example, a lower performing or simpler DSP may be used to implement the voice DSP 415, and lower capacity RAM may be used to implement the memory 420.

As indicated above, in this third embodiment, significant functionality is shifted from the video access apparatus 160 to an intelligent network 115. The intelligent network 115 is part of or incorporated within a network 140, and includes a central office switch 120, such as a class five switch, and an intelligent peripheral ("IP") 125 coupled to the central office switch 120 through one or more standard ports 124. The intelligent peripheral 125 may be implemented as a server or other network-based computer and, in this third embodiment, may be considered to be a videoconferencing server, preferably providing videoconferencing services (streaming) for multiple simultaneous calls or sessions. Also in this third embodiment, the video conferencing system 170 includes a video access apparatus 160 (which is coupleable to an intelligent network 115 having an IP 125), one or more telephones 295 (as audio input and output devices), one or more video displays 225, a video camera 230 and camera interface 235.

Continuing to refer to FIG. 15, in the preferred embodiment, because the IP 125 may be a shared resource of the network 140, capable of providing simultaneous videoconferencing services to a plurality of users, the IP 125 may be implemented with greater sophistication and processing power than that which might be otherwise available or cost effective if implemented directly within the video access apparatus 160. In the preferred embodiment, the video conferencing functionality shifted to the IP 125 includes on screen display (OSD) functionality, call control and configuration (such as call set up, call tear down, video call waiting, POTS call waiting, caller identification, three way calling), and user interaction, such as voice prompts, menu display, DTMF tone detection, and voice recognition (also referred to as user interface functionality). For example, for on screen display functionality, the IP 125 may transmit such information (via first communication channel 103) as compressed video information to the video access apparatus 160, eliminating the need for such OSD software (and any necessary OSD processor or other IC) in the video access apparatus 160. In addition, by including call control and configuration functionality within the IP 125, the call (or session) state machine software or other implementation within the video access apparatus 160 may also be greatly simplified, such as simply having two states, on and off. Also, with such call control functionality residing within the intelligent network 115, the intelligent network 115 may also provide for caller authentication and security, such that unauthorized use of the video access apparatus 160 may be preventable. The functionality retained in the video access apparatus includes audio/video compression and decompression, network interfacing (ISDN and POTS (V.34)), interfacing with a telephone (for audio input and output) and interfacing with a video display and video camera (for video input and output).

In addition, with the shift of such functionality to the IP 125, one or more interfaces or protocols may be defined between the video access apparatus 160 and the IP 125. For example, a higher performance, non-standard proprietary interface may be defined between the video access apparatus 160 and the IP 125. With such a proprietary interface, non-standard audio/video compression and data transmission protocols may be utilized in lieu of the H.32x or V.x protocols, such as a fractal based compression protocol, which may provide greater performance while significantly reducing the software complexity of implementing the H.32x family of protocols. In this situation, the IP 125 would have an interworking function (IWF), translating the proprietary interface protocol to any standard protocol suitable for the remote end party (such as an ISDN or POTS protocol). For such an implementation, the IP 125 would remain active and involved for the duration of the session or call.

A standard interface may also be defined between the video access apparatus 160 and the IP 125, which would allow direct communication between the video access apparatus 160 and the remote end, allowing the IP 125 to drop out of the communication following call set up and configuration. For such an implementation, the IP 125 may have a less complex implementation, and due to less involvement with any given session, may also be able to service a higher volume of sessions.

The use of an IP 125 in an intelligent network 115 may have additional advantages. For example, a user may have a speed dial or direct dial linkage to the user's assigned IP 125, for example, by dialing *99. The IP 125 could store the user's frequently dialed videoconferencing telephone numbers, creating a private videoconferencing directory, provide voice prompts for the directory, and utilize sophisticated speech recognition tuned for the particular user. Call set up procedures may also be more sophisticated and user transparent, for example, utilizing intelligent retry to first place an ISDN call and, if unsuccessful, to automatically retry and place a POTS call. Alternatively, the IP 125 could provide a network query to determine the type of device at the remote end, and automatically place the appropriate call, as an extension of the currently used signaling system seven.

The IP 125 could also provide other intelligent network services. In addition to being a "video server", the IP 125 may be utilized to provide a wide variety of video, telephony, multimedia, voice, and fax services. For example, as a fax server, the IP 125 could provide storage and forwarding of both incoming and outgoing faxes, such as storage of an incoming fax and subsequent forwarding for viewing on one or more of the video displays 225 at a later time. Other functions for which the IP 125 also may be utilized include voice mail, a network game server, a PC (computer) server (for application downloads), an on line or other internet server, and enhanced voice (telephony) services (such as call screening, call elimination, and "follow me" services which transfer calls in progress between wireline and cellular networks).

A particularly innovative feature of the various apparatus and system embodiments of the present invention is the interoperability of both ISDN and POTS within the same apparatus and system. This ISDN/POTS interoperability is also related to the "tri-ality" of the use of a telephone 295 in the preferred embodiment for telephony (POTS), for audio input and output (for video, either ISDN or POTS), and for call control (for selecting either video or telephony modes). As a consequence, when audio 220 or a telephone 295 may be being used for ISDN video conferencing, the method of the invention may include various modes for avoiding potential conflict with simultaneous POTS use. For example, during an ISDN video conference in which a telephone 295 is being utilized for call control and for audio input and output, the method provides for avoiding a POTS conflict, such as that which could occur if an incoming POTS call were received. One alternative for avoiding such conflict would consist of "busying out" the POTS line 107 when such an ISDN video conference is in progress. Another alternative would consist of providing POTS priority for the audio portion of the video conference, such as enabling a user to simultaneously receive the POTS audio while the video conference is occurring (or the video link maintained), for example, to provide for potentially exigent or emergency situations (such as emergency calls) which would typically occur via POTS lines. Other alternatives may include providing a POTS caller identification (caller ID) functionality, such that caller ID FSK modulated data could be displayed on a caller ID unit or on a video display 225 (or television 240), allowing the user to determine whether the video conference should or should not be terminated. Such an alternative may be implemented, for example, through a call waiting (flash hook) system, or by returning the POTS line to an on hook status followed by a ringing signal and going off hook. Similar conflict resolution schemes may be implemented for situations of an existing POTS call in progress followed by an incoming ISDN video call. In addition, a local, non-network flash system may also be implemented, allowing the user to toggle between a POTS call and a concurrent ISDN video call. Also as indicated above, such conflict resolution may also be implemented utilizing the combination of the keypad of a telephone 295 and video display 225 (or television 240) as a graphical user interface, for entry of user control signals and for selection of potentially competing calls.

Network configuration is yet another function which may be performed via a telephone 295 and user audio interface 255, especially utilizing menu options displayed utilizing an on screen display (on a television 220 or video display 225). For example, as disclosed in the fourth related application, automatic ISDN configuration capabilities, for example, for ISDN parameters such as switch type and SPID, may be implemented within the processor arrangement 190 and executed by the user via control functionality (as options entered by the user via the telephone 295 or other user interface 215). In addition, for POTS video conferencing capability, V.x or other modem configuration parameters (such as auto or manual answer) may also be configured as options entered by the user via the telephone 295 or other user interface 215. In the third embodiment, such functions may also be included within the IP 125.

The auto answer modem option also generates another possible area of conflict for POTS telephony versus POTS video conferencing, especially if a user is utilizing a telephone answering machine on the telephony (POTS) line 107. In the preferred embodiment, to determine whether an incoming POTS call is for telephony or video conferencing, in the preferred embodiment, a carrier (such as a V.34 carrier frequency) detector may be implemented, such that if a carrier is found, the video access apparatus 110 or 150 proceeds with V.x protocols (such as training), and if no carrier is detected, the video access apparatus 110 or 150 assumes a voice (telephony) call and allows the telephone 295 (or answering machine) to ring and answer the incoming call. This functionality may also be included within the IP 125.

Similarly for ISDN telephony versus ISDN video conferencing, the video access apparatus 110, 150 or 160 may detect an H.320 or other video protocol, and may provide a distinctive alert to indicate an incoming video call. If the user then goes off hook, then the ISDN video call is connected, for example, using the Q.931 protocol. Correspondingly, if an answering machine goes off hook, the audio portion of the ISDN call may be passed through, allowing an audio message to be left during, for example, an H.320 video conference call.

Numerous advantages from the various video access apparatuses 110, 150, and 160, and from the various video conferencing systems 170, 200, and 300, are readily apparent. First, because the output video signal is modulated and transmitted over the second communications channel 227, such as over an entire coaxial cable within the user premises, the audio/visual conferencing and telephony system of the preferred embodiment may operate at more than one designated node or location within user premises, for example, utilizing any videophone, or telephone and television, within the user premises, providing multiple viewing points and multiple participation points. Such broadcast capability of the video conferencing functionality is truly unique to the invention disclosed herein and in the second related application. In addition, the audio/visual conferencing and telephony system of the preferred embodiment may be mobile, utilizing the video camera 230 and camera interface 235 from a myriad of locations within the user premises and, indeed, from anywhere the second communications channel 227 (such as a coaxial cable) may reach. As a consequence, the user is not confined to a single location, such as at a PC or in a dedicated conference room, for video conferencing capability. In addition, the system may be configured as needed for additional locations, for example, simply by adding or removing televisions and video cameras.

In addition, in accordance with the preferred embodiment, the audio/visual conferencing and telephony system utilizes equipment typically found in consumers' homes or premises, such as existing televisions, video cameras or camcorders, and telephones. As a consequence, the system may be implemented at relatively low cost, especially compared to the currently available PC-based or stand alone video conference systems. In addition, and in contrast with prior art video conferencing systems, the system of the present invention is designed to be compatible for use with other existing video conferencing systems, for example, those which may utilize either ISDN or POTS networks, rather than being solely compatible with one or the other (but not both). Moreover, the system of the present invention is user friendly, easy to install and use, and should be relatively less expensive for in-home purchase and use by consumers.

Another interesting feature of the apparatus and system embodiments of the present invention is the multiple functionality of the user interface, for example, the dual use of a telephone (as a user interface) for control of the video conference call and for the audio portion of the video conference call. This feature is also in stark contrast to the prior art systems, which typically require special switching and special network operations for call placement and call control. Such duality is in addition to the concomitant use of the telephone for POTS service, creating a "tri-ality" of use. Yet another significant feature of the preferred embodiment of the present invention is the transparency of telephony operation, such that a user need not be aware of the video conferencing capability to place or receive a telephone call.

Other special features of the preferred embodiment of the present invention include the "loop back" operation, such that the same system may also be utilized for surveillance, such as baby monitoring, in addition to conferencing. With the multiplexing capability of the present invention, the video from multiple cameras may be looped back, for example, to provide simultaneous surveillance of multiple locations. Another significant feature of the present invention is the independence of the audio portion from the video portion of an audio/video conference. Moreover, the video conferencing capability illustrated is also protocol independent, such that a variety of communication protocols may be utilized and downloaded without user intervention.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A video access apparatus, comprising:
   a wireline network interface coupleable to a first communication channel, the wireline network interface having an ISDN interface for reception of a first ISDN encoded H.32x digital audio/video protocol signal, for transmission of a second ISDN encoded H.32x digital audio/video protocol signal, and for transmission and reception of a digital telephony signal;
   a radio frequency modulator to convert a baseband NTSC/PAL encoded composite output video signal to a radio frequency amplitude modulated vestigial sideband output video signal;
   a radio frequency demodulator to convert a radio frequency amplitude modulated vestigial sideband input video signal to a baseband NTSC/PAL encoded composite input video signal;
   an audio interface for reception of an input analog audio signal and conversion of the input analog audio signal to an input digital audio signal, and for conversion of an output digital audio signal to an output analog audio signal and for output of the output analog audio signal;
   a microprocessor subsystem coupled to the wireline network interface and the audio interface, the microprocessor subsystem responsive, through a set of program instructions, to decode the first ISDN encoded H.32x digital audio/video protocol signal to form an H.32x encoded output audio/video digital data stream, the microprocessor subsystem further responsive to convert an H.32x encoded input digital audio signal and an H.32x encoded input video signal data stream to the second ISDN encoded H.32x digital audio/video protocol signal; and
   an audio/video compression and decompression subsystem coupled to the microprocessor subsystem, and further coupled to the radio frequency modulator and to the radio frequency demodulator, the audio/video compression and decompression subsystem responsive, through the set of program instructions, to convert and compress the baseband NTSC/PAL encoded composite input video signal to the H.32x encoded input video signal data stream, to convert and compress the input digital audio signal to the H.32x encoded input digital audio signal, and to decompress and convert the H.32x encoded output audio/video digital data stream to the baseband NTSC/PAL encoded composite output video signal and the output digital audio signal.

2. A video access apparatus, comprising:
   a wireline network interface coupleable to a first communication channel, the wireline network interface having a telephony interface for reception and demodulation of a first V.x encoded H.32x analog audio/video protocol signal to form a first V.x encoded H.32x digital audio/video protocol signal, for modulation and transmission of a second V.x encoded H.32x digital audio/video protocol signal to form a transmitted V.x encoded H.32x analog audio/video protocol signal, and for transmission and reception of an analog telephony signal;
   a radio frequency modulator to convert a baseband NTSC/PAL encoded composite output video signal to a radio frequency amplitude modulated vestigial sideband output video signal;
   a radio frequency demodulator to convert a radio frequency amplitude modulated vestigial sideband input video signal to a baseband NTSC/PAL encoded composite input video signal;
   an audio interface for reception of an input analog audio signal and conversion of the input analog audio signal to an input digital audio signal, and for conversion of an output digital audio signal to an output analog audio signal and for output of the output analog audio signal;
   a microprocessor subsystem coupled to the wireline network interface and the audio interface; and
   an audio/video compression and decompression subsystem coupled to the microprocessor subsystem, and further coupled to the radio frequency modulator and to the radio frequency demodulator, the audio/video compression and decompression subsystem responsive, in conjunction with the microprocessor subsystem and the audio interface, through the set of program instructions, to decode, decompress and convert the first V.x encoded H.32x digital audio/video protocol signal to the baseband NTSC/PAL encoded composite output video signal and the output digital audio signal, and further responsive to encode, compress and convert the baseband NTSC/PAL encoded composite input video signal and the digital input audio signal to the second V.x encoded H.32x digital audio/video protocol signal.

* * * * *